Aug. 30, 1938.  J. B. McGAY  2,128,834
CHART CALCULATING MACHINE
Filed Nov. 2, 1933   7 Sheets-Sheet 2

Inventor
JOHN B. McGAY.

By Strauch+Hoffman

Attorneys

Aug. 30, 1938.  J. B. McGAY  2,128,834
CHART CALCULATING MACHINE
Filed Nov. 2, 1933  7 Sheets-Sheet 3
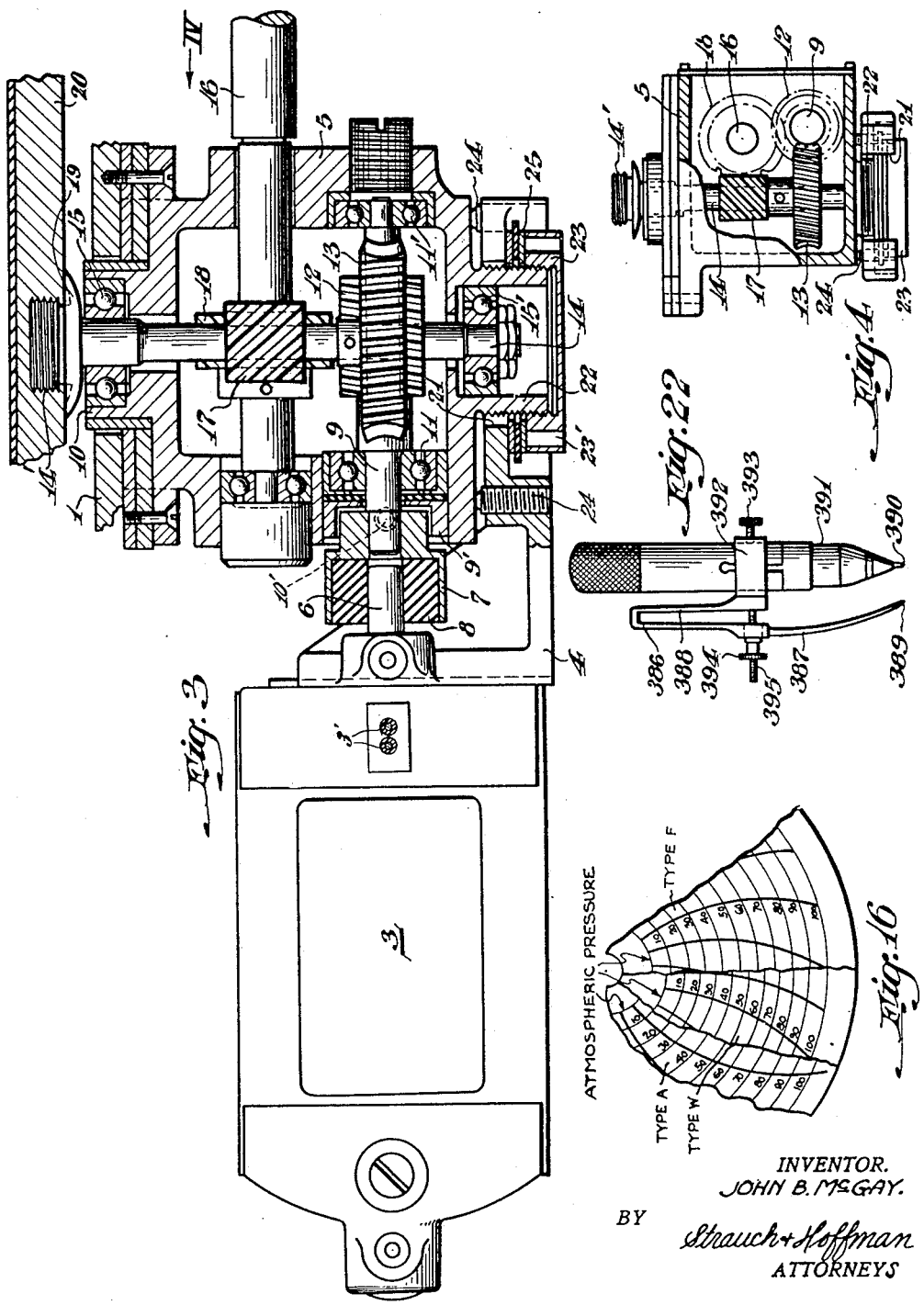
INVENTOR.
JOHN B. McGAY.
BY
Strauch+Hoffman
ATTORNEYS Aug. 30, 1938.　　　　J. B. McGAY　　　　2,128,834
CHART CALCULATING MACHINE
Filed Nov. 2, 1933　　　7 Sheets-Sheet 4
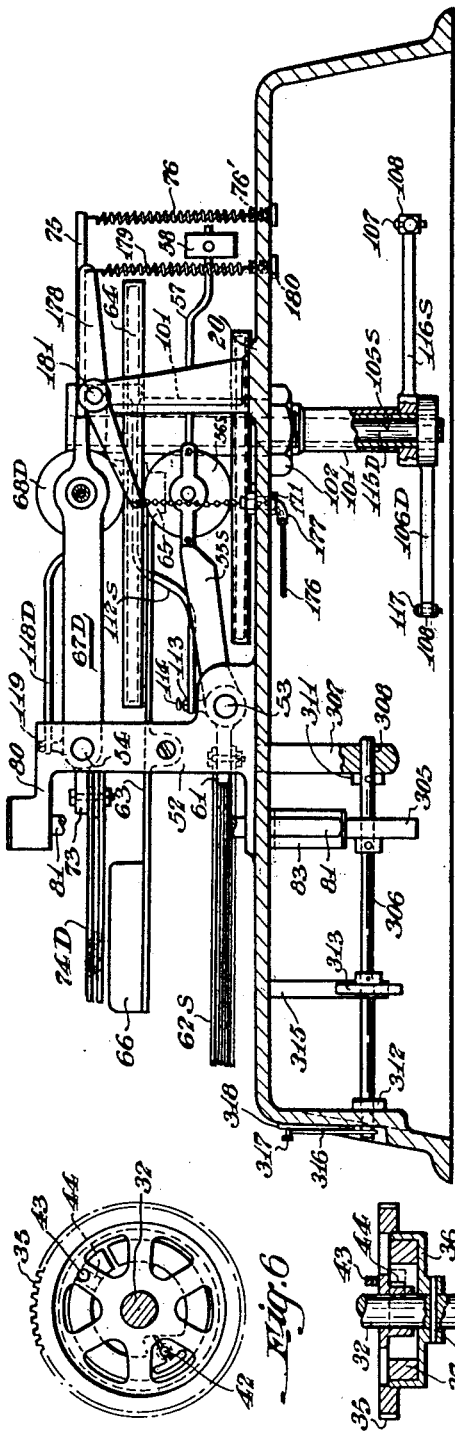
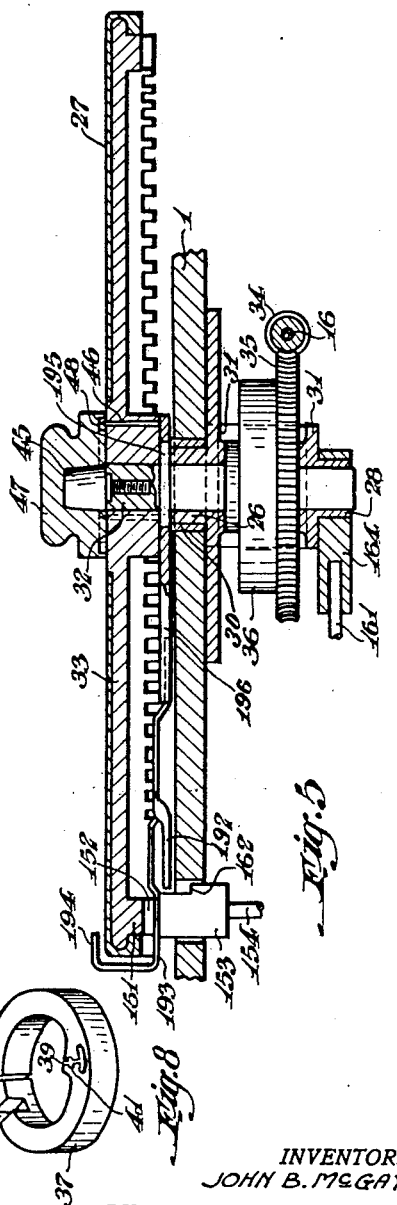
INVENTOR.
JOHN B. McGAY
BY Strauch + Hoffman
ATTORNEYS Aug. 30, 1938.   J. B. McGAY   2,128,834
CHART CALCULATING MACHINE
Filed Nov. 2, 1933   7 Sheets-Sheet 5
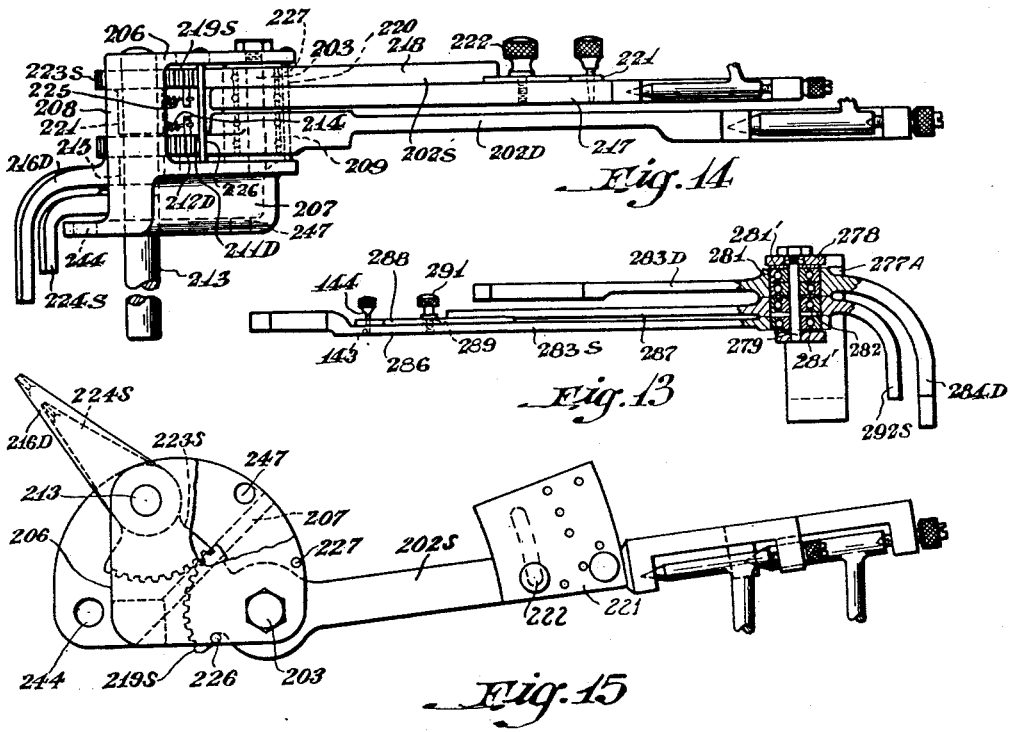
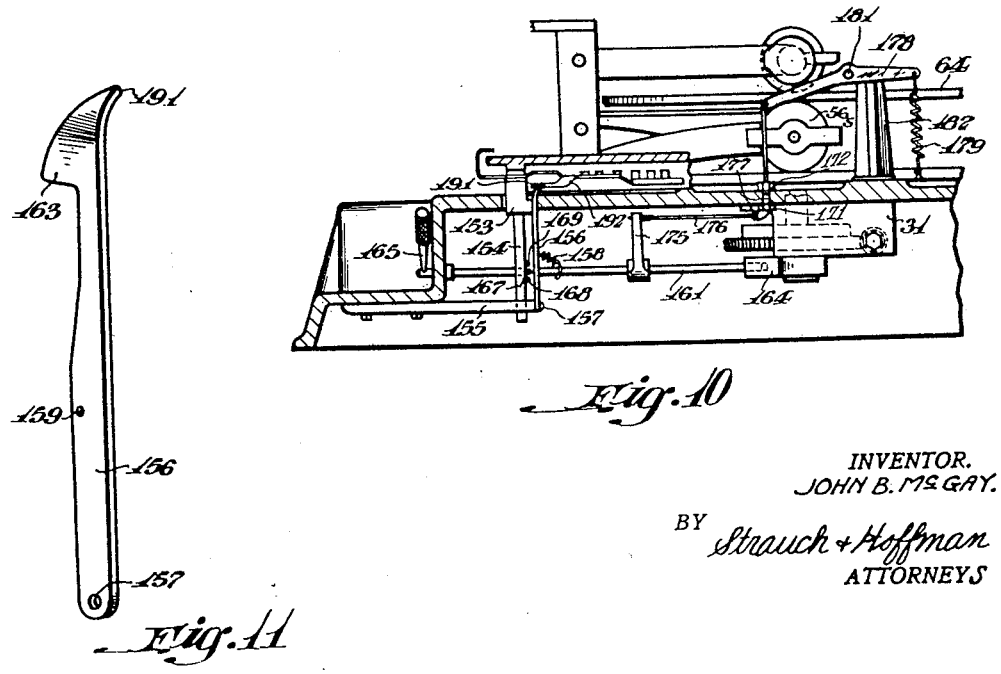
INVENTOR.
JOHN B. McGAY.
BY Strauch + Hoffman
ATTORNEYS Aug. 30, 1938.   J. B. McGAY   2,128,834
CHART CALCULATING MACHINE
Filed Nov. 2, 1933   7 Sheets-Sheet 6
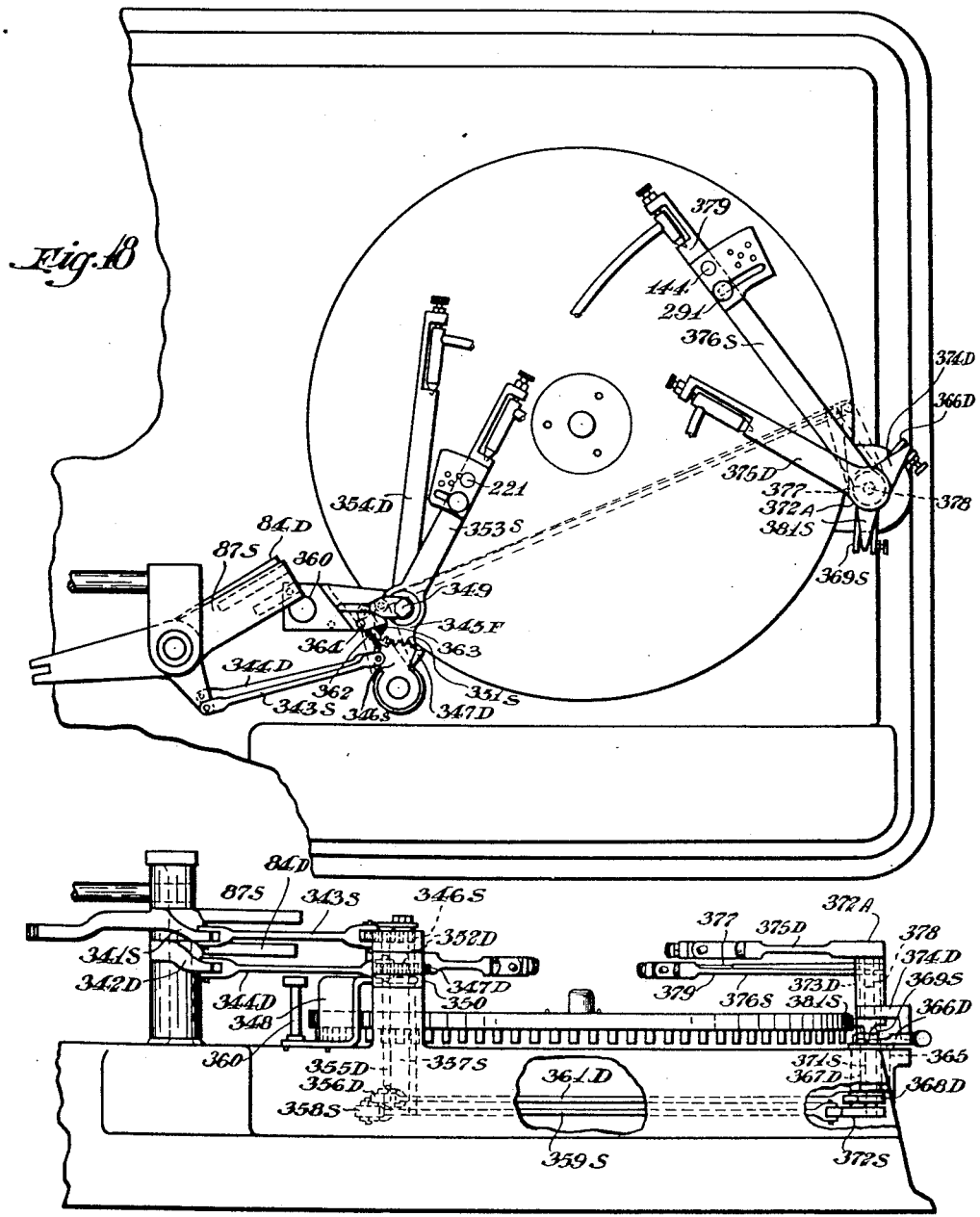
INVENTOR.
JOHN B. McGAY.
BY Strauch & Hoffman
ATTORNEYS

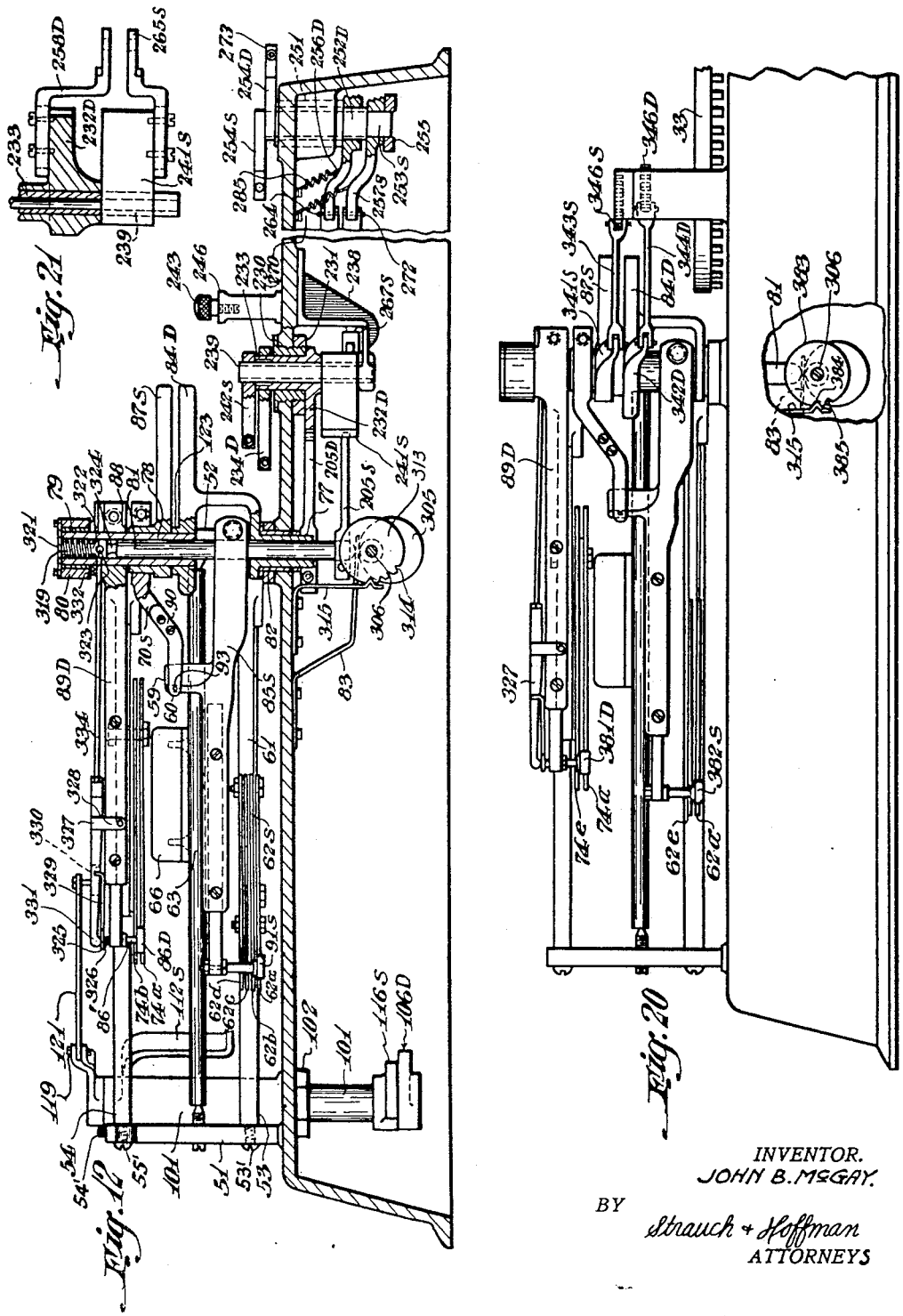

Patented Aug. 30, 1938

2,128,834

UNITED STATES PATENT OFFICE 2,128,834

CHART CALCULATING MACHINE

John B. McGay, Tulsa, Okla., assignor to Pittsburgh Equitable Meter Company, Pittsburgh, Pa., a corporation of Pennsylvania Application November 2, 1933, Serial No. 696,419

47 Claims. (Cl. 235—61)

This invention relates to an integrating apparatus particularly adapted for use in integrating the curves of orifice meter charts used for measuring the flow of fluids, although the apparatus is not limited thereto.

In measuring flows of fluids through conduits or pipes with orifice meters, it is common practice to insert in the pipe line an orifice plate having an orifice therein to thereby provide a differential of pressure on opposite sides thereof and to associate with the orifice plate an orifice meter. The orifice meters in common use usually have a mechanism whereby the differential in pressure on opposite sides of the orifice is recorded on a chart, and the static pressure is also recorded on the same chart. The graphic records thus produced are usually recorded upon a circular chart for a twenty-four hour period, and the quantity of fluid flowing in the pipe may be computed from the differential and static pressure curves recorded thereon.

In accordance with known laws of the flow of fluids, the average rate of flow of the fluid is equal to a constant multiplied by the square root of the product of the average absolute static pressure and the average differential pressure across the orifice. The constant entering this computation depends on the type of fluid, the temperature thereof, the design of the particular orifice meter and many other factors as is well known in the art.

In computing the volume of fluid passed from the two pressure curves, it has been common practice to select a plurality of short time intervals on a chart to be integrated to strike an average and compute the product of the static and differential pressures for each of said intervals, to manually extract the square root of each of these products and multiply by the meter constant, and then to sum up the results. It will be readily understood that this method of calculating volume flow is slow and laborious, is subject to human error, and is most unsatisfactory since the time intervals selected may not truly represent the average flow.

In my co-pending application for reissue Serial No. 568,484, now Patent Re. 19,009, and my application Serial No. 390,347, filed September 24, 1929, of which later application this is a continuation in part, I have disclosed a machine for accurately and rapidly integrating the static pressure and differential pressure curves of one type of orifice meter chart, and multiplying together the integral of the square roots of the values represented by the curves for computing the volume. There are three types of orifice meters in common use in large numbers, and as the characteristics, such as the relation of pen center to chart center, and linkage between the float and pen arm, of the various types of orifice meters are different, each type employs a chart that differs materially from the chart required by the other types. The machines disclosed in the above applications are intended for integrating only one type of chart for one make of meter and cannot be used for integrating the charts of any other type of orifice meter having different characteristics.

Accordingly, it is an object of the present invention to provide a machine that may be employed to accurately calculate the integral of the static pressure and differential pressure curves of various types of charts and multiply the integrals of the square roots of the values represented by the curves, which is so designed and arranged that it may rapidly and easily be adapted to integrate various types of orifice meter charts in various pressure ranges thereby producing a machine which is universal in character.

Another object of the present invention is to provide a chart integrating machine having an integrating mechanism cooperating with a plurality of interconnected tracing points having different laws of motion and a common control therefor whereby one integrating mechanism can be employed for integrating two or more types of charts.

A further object is the provision of proportional motion transmitting means between the various tracing pen centers whereby a constant ratio is maintained between the movement of the cam carriages and of the various tracing pen assemblies.

Still another object of this invention is to provide a calculating machine for orifice meter charts of different types and in which a simple manual adjustment is provided to accommodate charts of the same type having widely variant static pressure ranges, or charts of different types having widely variant static pressure ranges.

Another object is to provide a chart calculator having a plurality of static pressure and differential pressure tracing points operating under different laws in conjunction with a common square root cam whereby the same integrating mechanism can be employed for integrating various types of charts.

Another object is the provision of an integrator of the type referred to in which various cams can be used for various types of charts and in which shifting means is provided for proper cooperation of the correct cam for a given chart.

Another object is the provision of a novel motor mounting and reduction gear casing having provision for aligning the motor with the driven shaft and forming an impositive driving connection therewith.

Another object of my invention is the provision of an impositive driving connection between the chart plate and time disc whereby positive stopping of the chart plate can be accomplished without unduly straining the driving mechanism therefor.

A further object is the provision of a unitary pen assembly comprising static pressure and differential pressure curve tracing points that is readily removable yet can be quickly positioned accurately when reassembled for use, and which is not subject to accidental displacement.

Another object is the provision of an exceedingly accurate adjustment for various zero positions of the differential pressure and static pressure tracer points for compensating for temperature changes, and other changes in alignment possible, due to rough handling of the machine.

Another object of the present invention is to provide a chart integrating machine having a plurality of tracing point actuating mechanisms and novel means for coordinating the movements of these mechanisms with each other, in such manner that no lost motion exists and extreme accuracy of integration is obtained.

Another object is the provision of a tracing pen divider for retracing a curve to compensate for a constant inaccuracy therein, such as caused by loss of mercury from the orifice meter float chamber, etc.

Still a further object is to provide a novel and relatively simple means for affixing a chart to the chart plate of an integrator and for maintaining the chart in a relatively fixed position during the integrating process.

These and various other objects of the invention will be apparent from the following description and appended claims when taken in conjunction with the accompanying drawings, wherein:

Figure 3 is a detail view partly in section on line III—III of Figure 2 showing the operating motor and reduction gearing for driving the time plate.

Figure 4 is a view partly in section looking in the direction of arrow IV, Figure 3.

Figure 5 is a view partly in section on line V—V of Figure 2 showing the chart plate and driving means therefor and stop mechanism.

Figures 6, 7 and 8 are detail views of the friction clutch in the chart plate driving means.

Figure 9 is a view taken on line IX—IX Figure 1 with a portion of shaft 81 and its associated mechanism removed.

Figure 10 is a view in partial section on line X—X of Figure 1 showing details of the stop mechanism.

Figure 11 is a perspective view of the latch on the stop mechanism.

Figure 12 is a section on line XII—XII of Figure 1.

Figure 13 is a view in partial section of the type A static pressure and differential pressure tracing pen assembly.

Figure 14 is a side elevation of the pen carriage assembly for a type F chart.

Figure 15 is a top plan view of the pen assembly shown in Figure 14.

Figure 16 is a view showing a plurality of charts superposed for purposes of comparison.

Figure 17 is a side elevation of the static pen assembly for chart of type W.

Figure 18 is a top plan view of a modification showing a non-proportional motion transmitting linkage between the type W and type F assemblies.

Figure 19 is an elevation of Figure 18.

Figure 20 is an elevation of the cam carriage mechanism and cams employed in the modification of Figure 18.

Figure 21 is a detail view of the same.

Figure 22 is a detail view of the tracing pen dividers.

Figure 1:
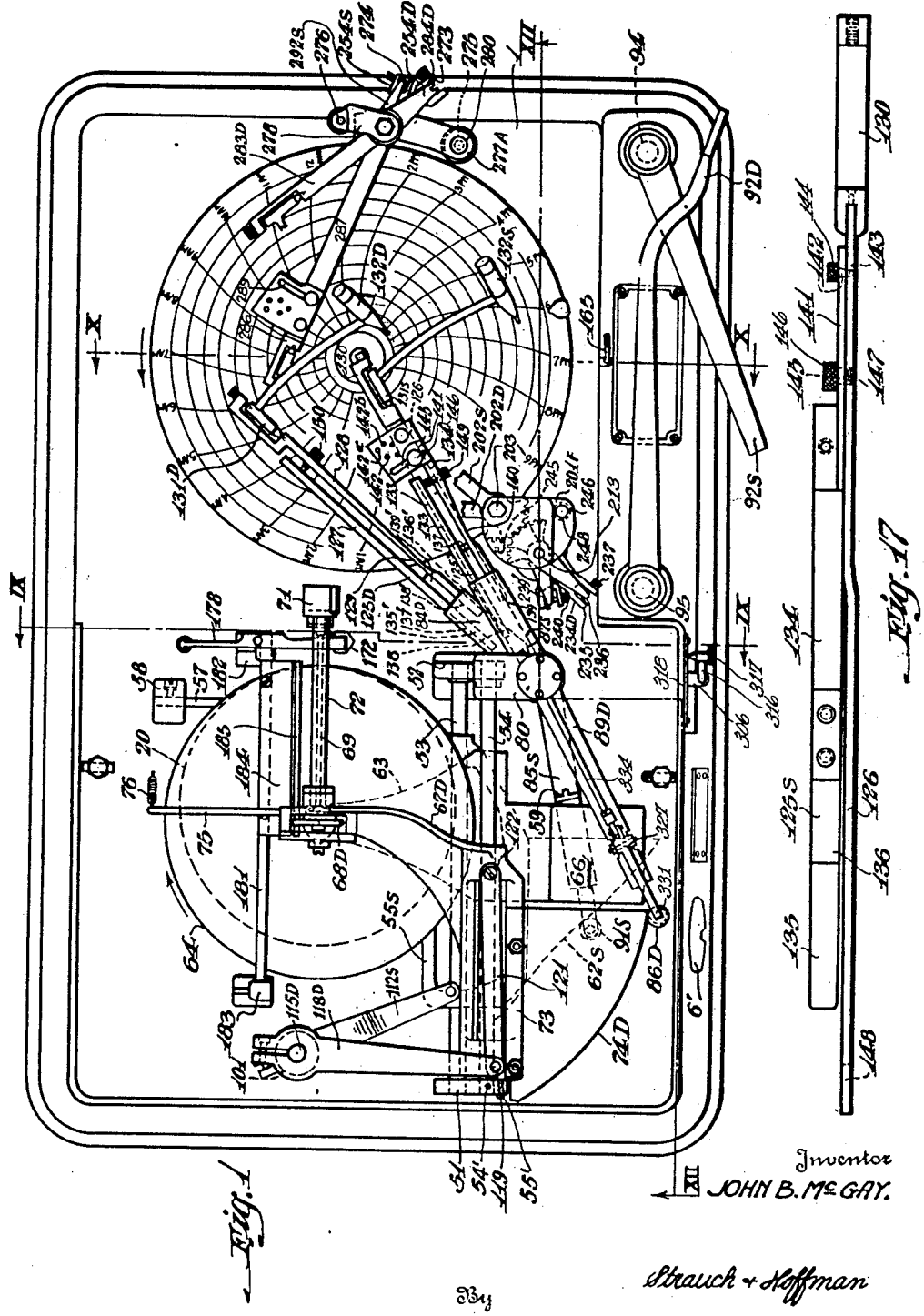
Figure 1 is a plan view in elevation of a preferred embodiment of my invention adapted for calculation of a plurality of types of charts.

Referring to the drawings, wherein like parts are designated by similar reference characters throughout the several views thereof, the mechanism of the calculating machine is carried on opposite sides of a base member 1, the base member having depending sides and being adapted to be supported upon a work table or bench by suitably positioned rubber feet 2, suitably secured thereto.

The mechanism supported on the top of base member 1 is adapted to be enclosed in a suitable removable housing (not shown). Suitably carried beneath the base member 1 (Figure 2) is an electric motor 3 for driving the moving parts of the calculator. The motor 3 is controlled through electrical connections 3' which pass through conduits 4' suitably secured to the base 1, and have suitable connections with the insulated socket 5'. The socket 5' is located in a recess 6' in the base 1. In order to clarify the description of this invention, the various units thereof will be described in detail, each unit being given a heading in order that the description may be easily located.

*The motor mounting and reduction gearing assembly*

Figure 2:
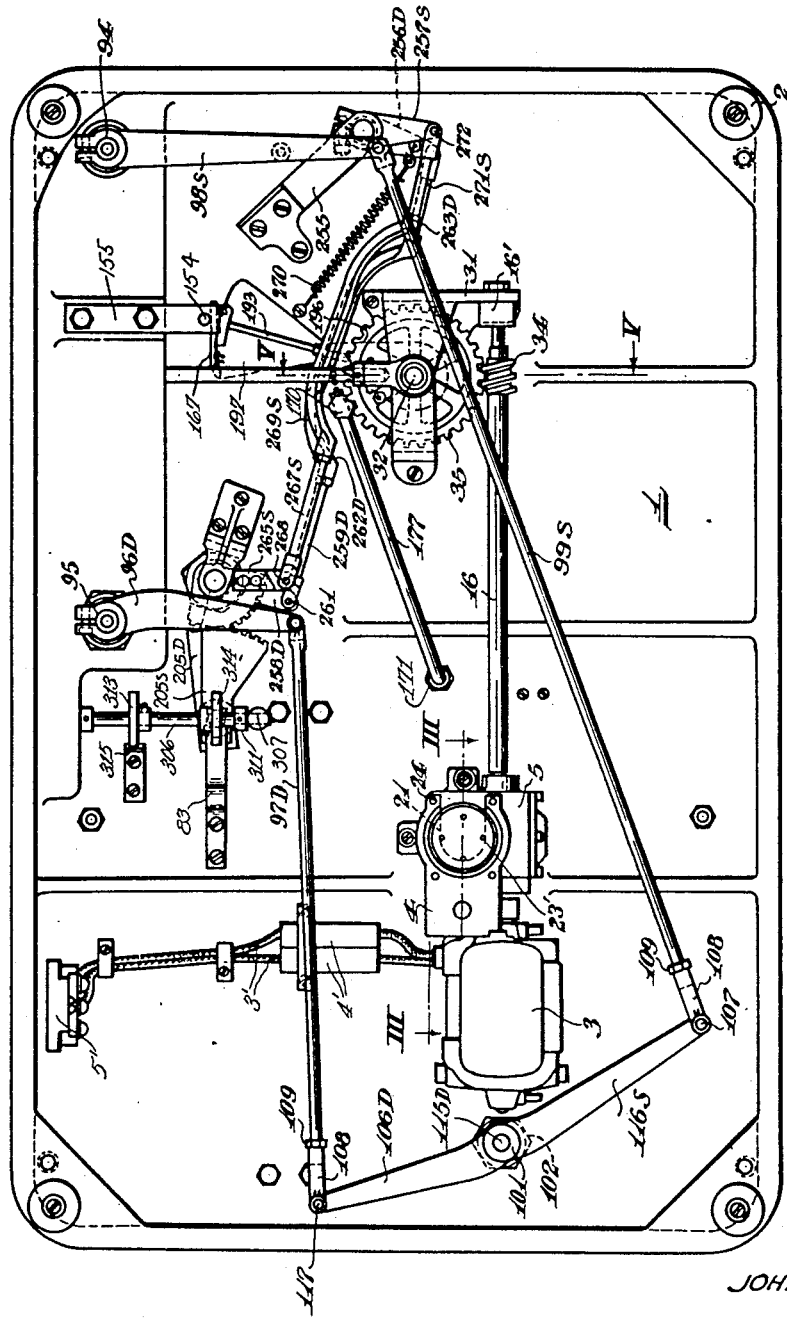
Figure 2 is a bottom view in elevation of Figure 1.

Referring to Figures 2, 3 and 4, the motor 3 is carried on an angle shaped frame 4 and is rigidly secured thereto by screws or other means, and this frame is adjustably secured to the flanged gear housing 5 which in turn is secured at its upper end to the bottom side of the base member 1 by bolts or other suitable means, and a hub 10 at the top of the housing surrounded by a fibre bushing extends through a suitable hole in base 1. Suitable gaskets of rubber or similar material are interposed between the housing 5 and base member 1 to take up vibration. The motor shaft 6 is forced into a frictional driving member comprising a metal cup 7 having a pressed fit on worm shaft 9 and an inset 8 of rubber or similar material having a hole therein to receive the motor shaft 6. However, any other type of universal or frictional coupling may be used between the motor shaft and worm shaft.

In order to properly align the motor shaft 6 and worm shaft 9 the motor bracket 4 has a bifurcated extension 21 into which fits the externally threaded hub 22 on the bottom of casing 5. A collar 23 having holes 23' therein is threaded over this hub and bears against a suitable shoulder surrounding bifurcation 21, and a plurality of adjusting screws 24, preferably four in number, are threaded through the bracket extension and bear against the bottom of casing 5. Suitable washers 25 including a rubber or similar resilient washer are interposed between collar 23 and bracket 4 to take up vibration. It will be seen that by proper adjustment of set screws 24 and of collar 23 by means of a spanner wrench (not shown) fitting into holes 23' the angular position of the motor 3 can be adjusted and the motor shaft 6 can be brought into alignment with worm shaft 9.

Worm shaft 9 is supported at either end in suitable ball bearings 11, 11' mounted in the gear casing 5, and is driven by the motor through the flexible coupling just described. A retaining washer 9' locked in place by set screw 10' prevents axial movement of the shaft 9. A worm 12 on shaft 9 meshes with a worm wheel 13 secured to vertical time plate shaft 14 which is mounted in similar ball bearings 15, 15' at the top and bottom of gear housing 5 and extends through the hub 10 which extends above the base 1. A threaded coupling member 14' on the end of shaft 14 is adapted to receive and frictionally hold in threaded engagement a driving disc or time disc 20 against the stiff but flexible shoulder 19, and the purpose of this disc will hereinafter appear. A chart plate driving shaft or line shaft 16 is driven from vertical shaft 14 through meshing spiral gears 17, 18.

*Chart plate and driving means therefor*

The charts of orifice meters are usually circular and have two curves inscribed thereon, one curve representing the static pressure in the conduit below the orifice with which the meter was associated, and the other curve representing the differential pressure on opposite sides of the orifice. This invention is described in connection with circular orifice meter charts, and is particularly designed for use therewith, but it will be understood that the calculator is not so limited since it may be used to integrate any quantity or the square root of any quantity or a product of any two quantities represented by curves on strip charts, and by simple modification can be similarly used for strip charts.

Referring now to Figures 2 and 5, the base member 1 is provided with an opening adjacent one end thereof in which is positioned a bushing 30, and a hub 26 integral with gear supporting bracket 31 extends therethrough. The supporting bracket 31 is secured to the underside of the base by screws or other means. The chart plate shaft 32 extends through the hub 26 above the base and has a chart plate 33 suitably secured thereto at its upper end. This chart plate preferably has a covering 27 of tread stock rubber or other suitable material. The lower end of shaft 32 extends through bracket 31 and is journalled in a suitable hub 28 on the lower side thereof. Line shaft 16 is journalled at its end in a universal ball bearing 16' secured on an extension of bracket 31 and has a worm 34 secured thereon which drives worm wheel 35 freely rotatable on shaft 32. Shaft 32 has a hollow drum 36 (Figures 5, 6, 7 and 8) pinned thereto by a suitable pin 36' and an annular expansible friction shoe 37 is located inside this drum. This shoe is split on one radius as indicated at 38 and is bifurcated diametrically opposite, the inner bifurcation being split at 39 and having a tapped hole 41 therein. A tapered screw 42 fits into this tapped hole 41 and as it is turned inward spreads the two portions of the shoe to develop the desired frictional resistance between shoe 37 and drum 36. Shoe 37 is rotatable relative to shaft 32 and is pinned to worm wheel 35 by a pin 43 having an enlarged head fitting into slot 44 on the shoe 37 so that when gear 35 is driven by worm 34 the shaft 32 is impositively driven through frictional coupling comprising the shoe 37 and drum 36.

The chart plate 33 is suitably secured to shaft 32, and a rounded cap or stub 45 may be threaded into the end of shaft 32 to properly center the chart which has a central hole therein. The chart to be integrated is placed on the rubber covered chart plate and is held against rotation relative thereto by prongs 46. Cooperating with prongs 46 is a retainer member 47 slidable on the stub 45 and having an annular groove 48 formed in the lower face thereof and which is adapted to receive pins 46. When it is desired to change charts, retainer member 47 is removed, the old chart taken off, and a new chart is slipped over the projecting stub 45 on to the rubber covered plate. Retainer member 47 is then slipped over the end of stub shaft 45 and is pressed downward to cause the chart to be impaled on pins 46. Retainer member 47 and pins 46, acting in conjunction with the rubber covering cause the chart to be positively driven by plate 33.

*The integrating discs and wheels*

As previously described the time disc or plate 20 is driven with shaft 14 by the motor 3 in synchronism and at a predetermined speed in relation to the rotation of chart plate 33 driven from line shaft 16. Referring to Figures 1, 9 and 12, there are two spaced brackets 51 and 52 mounted on the base in any suitable manner on the left half of the machine. These brackets carry between them the differential pressure wheel carriage supporting rod 54 suitably locked in place by a set screw 54', and the static pressure wheel carriage supporting rod 53 likewise locked in place by a set screw (not shown) and upon which the differential pressure wheel carriage and static pressure wheel carriage respectively are slidably and pivotally mounted. The static pressure wheel carriage 55S comprises a light weight tapered frame work with suitable bearings at its inner end rotatably supporting a static pressure wheel or roller 56S therein. The static pressure carriage has an extension 61 at its other end to which is secured in spaced relation a group of cams indicated generally by numeral 62S and individually as 62a, 62b, 62c and 62d. A rod 57 extends from the opposite end of the pressure carriage and has a counter weight 58 on the end thereof for partially counterbalancing the weight of the cams. As shown, there are four cams secured to the extension 61 of the static pressure carriage, and in case the number or sizes of cams on this carriage is changed the counter weight can be adjusted along the rod 57 to properly counterbalance the weight of the cams. Movement of the static pressure carriage 55S and static pressure wheel 56S is limited to the left as seen in Figure 12 by the bracket 51 so that the static pressure roller 56S cannot be moved closer to the center of time plate 20 than a distance corresponding to atmospheric pressure for a reference chart, which is preferably a 100 pound static pressure range chart. Movement of the carriage 55S to the right is limited by the bracket 52 to prevent the roller 56S from being moved past the outer edge of time plate 20.

The idler disc carriage 63 is pivotally mounted between brackets 51 and 52 on suitable bearings and at its inner end carries a rubber covered idler wheel 64 rotatably supported in an anti-friction bearing member 65 on the carriage. The weight of the idler wheel 64 is partly counterbalanced by a weight 66 on the carriage 63 and normaly the idler wheel 64 rests with its lower surface in contact with the periphery of static pressure wheel 56S. It will be seen therefore that upon rotation of the time plate 20 the pressure wheel 56S resting on and frictionally engaged by the rubber covered time plate is rotated thereby, and the idler wheel 64 which rests upon the pressure wheel 56S is rotated in turn by the pressure wheel. Preferably the time plate 20 is covered on one side with a layer of tread stock rubber, and the idler disc 64 similarly is covered with rubber on both sides.

The differential wheel carriage 67D is similarly slidably and pivotally mounted on rod 54 and carries at its inner end a counter wheel 68D suitably supported in bearings therein. The counter wheel 68D is mounted upon a shaft 69 connected to operate a suitable counter 71 carried by a tube 72 extending from the counter wheel carriage 67D and through which the shaft 69 passes. The differential pressure wheel carriage likewise has an extension 73 to which are secured a group of cams indicated generally by numeral 74D and individually as 74a, 74b. The weight of these cams is partly counterbalanced by the counter 71 and associated mechanism, and a rod 75 secured to the counter wheel carriage having a spring 76 at its end secured in an eye screw 76' passing through the base biases the counter wheel downward with the required pressure against idler wheel 64. The counter 71 is driven directly from counter wheel 68D whch frictionally engages the top surface of the idler wheel 64. Movement of the differential pressure carriage 67D and differential wheel 68D is limited to the left by the bracket 51 so that the differential wheel 68D cannot pass the center of idler disk 64, and movement to the right is limited by bracket 52 to prevent the roller 68D from being moved past the outer edge of idler disk 64.

*Static and differential pen control*

The bracket 52 (Figures 1, 9 and 12) has a lateral extension 80 at the top thereof in which is journalled a shaft 81. This shaft extends through the extension and through a flanged bushing 82 in the base on a spacing washer and its lower end is supported by one end of a spring member 83 having one end secured to the base. A differential pressure pen arm carriage 84D is pivoted about this shaft 81 at its lower end and has an elongated hub 77 extending about the shaft 81 and through the bushing 82. The upper end of the pen arm carriage 84D is secured to a sleeve 78 which extends along shaft 81 and is journalled in a bushing 79 in the extension 80 of bracket 52. A roller carrier 89D is suitably clamped to the sleeve 78 near its top and carries at its outer end a roller 86D pivoted to rotate freely on its axle 86'. The roller carrier 89D is biased to maintain roller 86D in contact with the edge of one of the cams of group 74D by a spring which will be described hereinafter.

A static pressure pen carriage 87S is swivelly mounted about the sleeve 78 and rests upon a suitable spacer hub 123 on carriage 84D. The static pressure pen carriage 87S has an upwardly extended hub 88 surrounding sleeve 78, and a link 70S is suitably clamped to this hub at one end and has its other end bifurcated to form a guide 60. The roller carrier 85S is clamped to the shaft 81 in any suitable manner to rotate therewith, and has an upright key 59 which fits between the bifurcated ends 60 of link 70S. A spring 90 is secured to the side of link 70S, and a ball bearing 93 is interposed between the key 59 and spring 90 in a suitable recess in the spring for biasing the link 70S and extension roller carriage 85S together to take up slack at this joint. The carriage 85S has a cam roller 91S freely journalled at its end which rides over the edges of one of the cams in group 62S and which is maintained in contact therewith by a spring to be later described. The spacing of the cams in groups 62S and 74D and the width of the rollers 91S and 86D are such that the rollers can each contact at the same time only one cam of their respective groups. The static pen control arm 92S (Figure 1) and differential pen control arm 92D are pinned to suitable trunnions 94 and 95 respectively journalled in a suitable ball bearing assembly in the base 1. Beneath the base an arm 96D (Figure 2) is suitably clamped on the trunnion 95 to rotate therewith as the lever 92D is shifted, and at its outer end is pivotally secured a bifurcated connecting rod 97D. The trunnion 94 likewise has an arm 98S secured thereto, and at its outer end is pivotally secured the bifurcated connecting rod 99S.

At the left end of the base as shown in Figure 1 (Figures 1, 9 and 12) a flanged hollow post 101 passes through a suitable opening therein, and is held in position in any suitable manner as by a nut 102 threaded on to a threaded reduced portion of the post adjacent the flange. A hollow shaft 105S is journalled within the post 101 and at its lower end beneath the base has secured thereto in any suitable manner an arm 116S to which the connecting rod 99S is pivotally secured at its outer end as indicated at 107. The length of the rod 99S can be adjusted in any suitable manner and in the preferred embodiment has a clevis 108 threaded on the end thereof and held against turning by a nut 109. The other end of the hollow shaft 105S which extends from the post 101 has secured thereto an arm 112S, which in turn is pivoted to one end of a link 113, the other end of which is pivotally secured at 114 to the slidable carriage 55S. A shaft 115D is journalled within the hollow shaft 105S and extends therefrom at both ends. At its lower end is suitably secured an arm 106D to which the connecting rod 97D is pivotally secured at its end as indicated at 117. The length of rod 97D can be adjusted in a similar manner as the length of rod 99S through a clevis 108 and nut 109. At the upper end of shaft 115D is secured an arm 118D pivotally connected at 119 to one end of a link 121 which at its other end is pivotally secured to the sliding carriage 67D as indicated at 122.

The static pen assembly 125S (Figures 1 and 17) comprises a flat adjustable supplemental arm 126 having a C-shaped enlarged portion 130 at its outer end in which is swivelled a pen holder 131S having a pen or stylus 132S secured thereto at its end. An arm or holder is provided comprising two posts 133 and 134 rigidly pinned together with a spacer 137 therebetween and having cylindrical ends 135 and 136 which fit into the holes 138 and 139 in the end of static pen carriage 87S. The post 134 is reduced at 140 to serve as a spring, and has a segment or plate 141 secured thereto at its end. This plate has a group of holes therein indicated generally by the numeral 142 and individually as 142a, 142b, etc., adapted to be brought into registry with a similar tapered hole 143 in the arm 126, and a registry pin 144 passing through a hole 142 pins the arm 126 and post 134 together. The plate 141 has a slot 145 therein, and a locking pin 146 passes through the slot into a threaded hole 147 in the arm 126 to lock the post 134 and arm 126 in adjusted position. The arm 126 has an arcuate cut out portion 148 which fits about the spacing hub 123 (Figure 12) in assembled position. By means of a screw 149 threaded into post 134 and bearing against post 133 a delicate adjustment is obtained as will hereinafter appear.

The differential pen assembly 125D (Figure 1) comprises two posts 127 and 128 rigidly secured together with a spacer 139' between, and having similar cylindrical ends 135' and 136' which fit into the holes 137' and 138' in the end of differential pen carriage 84D. The post 128 is reduced at 129 to serve as a spring, and at its outer end is swivelled a pen holder 131D having a pen or stylus 132D secured thereto at its end. An adjustment screw 150 threaded into post 128 and bearing against post 127 provides a similar accurate adjustment.

Operation

The manner of operating the machine so far described now will be explained. A chart to be integrated is placed upon the rubber covered chart plate and is impaled on the pins 46 by having the retainer 47 placed over the shaft stub 45. When the operative shifts the static pen control arm 92S he rotates trunnion 94, and swings arm 98S therewith about the trunnion 94 as a pivot. Through the link 99S the swinging motion is imparted to arm 116S which is secured to hollow shaft 105S extending through the post 101 in the base, and as arm 112S is secured to this shaft the swinging motion of arm 112S will bear a definite predetermined ratio to the swinging movement of control arm 92S. This relation can be varied, if necessary, by adjusting the length of rod 99S, or by using different length arms at 98S or 116S. As arm 112S is connected to sliding carriage 55S by a link 113, the movement of control arm 92S will slide the carriage 55S back and forth on static pressure carriage rod 53, moving the cam group 62S therewith.

Let it be assumed for the present that the cams 62S are right angled triangles and that the roller 91S moves along the face of the hypotenuse as the carriage and cams are reciprocated by the control arm 92S along the rod 53. As the roller 91S is kept in contact with the cam edge by a suitable spring the movement of the cam 62S will pivot the roller carrier 85S about shaft 81 and link 70S will pivot the static pen arm carrier 87S about the sleeve 78. By proper movement of control arm 92S the static pressure pen 132S can be caused to follow the static pressure curve on the chart as the chart is rotated with the chart plate.

The chart plate 33 and time disc 20 are rotated synchronously by motor 3 in a predetermined relation through the reduction gearing in case 5, line shaft 16 and gearing in frame 31. As the operative manipulates the control arm 92S to cause the pen 132S to follow its curve, the movement of carriage 55S will move the roller or wheel 56S varying distances from the center of time plate 20, and the roller 56S will be driven at varying speeds depending on the contour of the static pressure curve. The movement of control arm 92D similarly shifts the carriage 67D along its carriage rod 54, through the arm 96D, arm 106D, shaft 115D and arm 118D, and through the cam group 74D, and roller 86D causes the roller carrier 89D secured to sleeve 78 and differential pen carrier 84D secured thereto to move in a path so that the differential pressure tracing pen 132D follows the curve on the chart.

The instantaneous speed of the periphery of roller 56S will be some multiple K of the absolute pressure being registered at that instant by the tracing pen 132S, and the revolutions turned by the idler disc during any infinitesimal lapse of time may be expressed as the integral $$K \int \frac{dp}{dt},$$

where $p$ is the absolute static pressure, and K is a machine constant based on the ratio between actual revolutions of the idler disc representing the desired numerical value of the chart being calculated, and the revolutions of the chart. The revolutions turned by the idler disc 64 in any given length of time value represented on the chart be $$KT\sqrt{P}$$

where K is the machine constant mentioned above, T is the time integral, and P is the average absolute pressure registered by the orifice meter pen, it being understood that the cam 62S guides the static pressure pen 132S so that the distance of roller 56S from the center of plate 20 is proportional to the square root of the absolute pressure being traced by the pen. The peripheral speed of roller 56S is transmitted to idler disc 64, and if a constant speed of idler disc 64 is assumed; in other words, a constant pressure being assumed indicated by the static pressure pen 132S, the differential roller 68D would have a peripheral speed which is some multiple C of its distance from the center of the idler disc. If the cam 74D is a square root cam, such as a parabolic cam, this distance from the center of the idler disc will be some multiple of the square root of the position on the chart of pen 132D, and the revolutions turned by roller 68D would be the integral of the square root of the differential pressure, or $$C \int \sqrt{\frac{dp}{dt}}.$$

But the idler disc 64 reproduces the integral of the square root of the static pressure curve in terms of revolutions, and roller 68D multiplies this integral by the integral of the square root of the differential pressure curve, thereby rendering a value in terms of revolutions known as the extension of the chart. This is expressed mathematically as $$T\sqrt{P.D},$$

where P is the integral of $p$ and D is the integral of the differential pressure.

The stop mechanism

Plate 33 (Figures 5 and 10) is provided with a downwardly projecting rim 151 in which a multiplicity of slots 152 are accurately machined for the reception of a stop mechanism operating as follows: Base member 1 has a rectangular opening therein for slidably receiving a stop member 153 which has a stem 154 extending downwardly and slidably journalled in bracket 155 secured to base 1. The stop member 153 is normally pressed upwardly by means presently to be described. It is adapted to be held in its lower position by a latch member 156 pivoted at 157 to bracket 155, this latch being held in engaged position by a spring 158 secured to the latch at one end in hole 159 and to shaft 161 at its other end. The stop member has a step 162 which is adapted to be engaged by an overhanging portion 163 of latch 156. Shaft 161 extends through the depending portion of base 1 at one end, and its other end is journalled in a bearing member 164 swivelled upon the depending hub 28 of the frame 31, and is held in adjusted position by a set screw (not shown).

Setting lever 165 is arranged to oscillate shaft 161 and an arm 167 thereon cooperates with projections 168 and 169 on stem 154 for retracting the stop member 153. When so retracted the overhanging portion 163 of latch 156 engages the step 162 on the stop member 153 to hold the stop in retracted position.

The shaft 161 has secured thereon an arm 175 to which is attached a flexible chain or cable 176 (Figures 9 and 10) which passes through a conduit 177 and up through the base where its other end is secured to one end of a rocker arm 178. The conduit 177 passes through a hexagonal head screw 170 threaded into the base which supports one end thereof, and its other end is held in the base between two hexagonal nuts 171 and 172 threaded on the upturned threaded end of the conduit. The other end of rocker arm 178 is biased by the tension of a spring 179 secured in an eye screw 180, and the tension of this spring transmitted through rocker arm 178 and cable 176 attached to arm 175 tends to rotate shaft 161 counter clockwise. The arm 167 secured to shaft 161 is therefore kept pressed against the upper pin 169 on the stem 154 of stop member 153 when this member is in depressed position and biases stop member 153 upward.

The rocker arm 178 is secured to one end of a rock shaft 181 (Figure 1) which is journalled in brackets 182. This shaft extends along the face of idler or differential wheel 64 and is rotatably supported at its other end in a bracket 183. Secured to this shaft is a brake member 184 having a rubber or similar edge 185 which is positioned between counter wheel 68D and idler disc 64 and normally during operation is out of contact therewith. In stopped position brake member 184 raises counter wheel 68D out of contact with idler disc 64, the rim of counter wheel 68D being in frictional contact with the rubber edge 185.

The shaft 32 (Figure 5) has a flange 195 integral therewith, and a swivel plate 196 is swivelly located thereon in spaced relation to the chart plate 33 and base 1. The spring stop member 193 is secured thereto in a recess at one end, in any suitable manner and has a finger piece 194 whereby it may be depressed. A hole 197 in the base 1 is provided to permit access thereto for repair or replacement when required. Latch 156 has a projecting portion 191 adapted to be engaged by a projecting striker 192 on spring stop member 193. The spring member 193 is of such width as to fit into any one of the uniform slots 152.

The operation of the brake mechanism is as follows: When a chart has been positioned on the rubber covered chart plate 33 the finger piece which is positioned directly over the stop member 153 is depressed by the operative thereby depressing the stop member 153 against the bias of spring 179 transmitted through rocker arm 178, chain 176, arm 175, shaft 161 and arm 167 coacting with pin 169. The spring 158 pivots the latch member 156 towards shaft 161 and causes the overhanging portion 163 thereof to engage step 162 of stop member 153 to hold it in retracted position when spring member 193 is released.

Release of finger piece 194 permits spring member 193 to enter one of the slots 152. The lever 165 provides an auxiliary means for depressing the stop member, for by rocking this lever clockwise the arm 167 on shaft 161 engages pin 168 and depresses the stop member 153.

The spring stop member 193 being set in the proper recess 152, the tracing points 132S and 132D are positioned on their respective curves by the operative and the motor 3 is started. The chart plate 33 is driven through line shaft 16 and friction couplings 36, 37, and as the operative traces over the curves on the chart the proper values will be recorded in counter 71 as previously described. The member 193 does not leave the notch 152 but rotates with platen 33, and when the platen has made one complete revolution the depending portion 192 of stop lever 193 will engage the projection 191 of latch 156 and rock it about its pivot 157 thereby releasing overhanging portion 163 from step 162 of stop member 153. Because of the biasing action of spring 179 tending to raise stop member 153 the member 153 will spring into a notch 152 and stop rotation of the platen at exactly one revolution. Simultaneously therewith the pull of spring 179 on rocker arm 178 rocks shaft 181 causing the rubber edge 185 of brake member 184 to engage counter wheel 68D and lift it and the carriage 67D out of contact with the idler disc 64. The rubber edge 185 instantly stops the rotation of wheel 68D and thereby stops operation of counter 71 at exactly the proper position with reference to the curve on the chart. The motor 3 may not be stopped instantly by the operator, and its momentum and the inertia of the moving driving gearing would throw a severe strain on the mechanism. However, because of the friction drive 36, 37 in the platen drive assembly, and the friction coupling 7, 8 between the motor shaft 6 and worm shaft 9, these parts may continue to rotate without danger of breakage until the operative stops the motor.

As usually constructed, the orifice meter charts are so arranged that a complete revolution thereof corresponds to 24 hours of use. If for any reason, it is desired to integrate a smaller portion of the chart, such as for example, four hours, the stop member 153 is depressed as previously described, and the spring stop member 193 is moved back sixteen notches, each notch corresponding to one-quarter hour, and the tracing points are positioned to trace the portion of the curve to be integrated. The motor is operated as before to rotate the platen 33. When the tracing points have reached the end of the desired period, the spring stop lever 193 will have returned to zero position and will rock latch 156 as previously described to stop the mechanism.

*Examples of chart types*

In Figure 16 is shown a fragmentary view of three types of orifice meter charts superposed to bring out the characteristic differences in the charts. For convenience these charts are indicated as type A, type W and type F. On each chart the extreme inner circle represents atmospheric pressure, which generally is taken as 14.4 pounds per square inch, and the extreme outer circle in charts A, W and F represent a static pressure of 100 pounds per square inch gauge. Therefore it will be seen that the radial distance from the inner circle to the outer circle is not the same for any two of the three charts. The spaces between the extreme inner and outer circles of the charts are usually divided into ten uniform sub-spaces. The differential pressure also is usually recorded on the same chart, and the extreme inner circle therefore represents zero differential pressure while the outer circle may represent a definite differential pressure.

It will also be noticed that each chart has a series of radial arcs, and on chart A the center of the radial arc circle is on the right, while in charts W and F the centers of the corresponding arcs are at the left. Further considering charts W and F these arcs are struck on separate centers not equally distant from the center of the chart and therefore do not coincide, and further the angles subtended by the arcs are not equal. Considering charts A and W, the angle subtended by the arcs likewise are not equal nor are the arcs coincident. The centers of these arcs represent the centers about which the recording pens of the several orifice meters swing in recording the static pressure and differential pressure curves on the charts.

The apparatus so far as has been described is intended for operation on chart type W. The center about which the pens 132S and 132D are pivoted in tracing their respective curves corresponds to the center of the radial curve of chart type W, so that with the chart at rest the tracing pens would describe a radial arc coincident with the radial arcs on the chart. In order to adapt the apparatus for integrating chart types A and F it is necessary to transpose the center of pen motion to coincide with the centers of the radial arcs of said chart types, and further if it is desired to use the same cam for integrating chart types A and F as is used for integrating chart type W it is necessary that a direct proportional motion be transmitted from the cams to the respective tracing pens. The apparatus by which this is accomplished now will be described.

*Tracing pen assembly for type F charts*

Referring to Figures 1, 14 and 15, it will be seen that a static pressure and differential pressure tracing assembly indicated generally by the numeral 201F is located adjacent the bracket 52 about which carriages 87S and 84D pivot, and has static pressure and differential pressure pen carriages 202S and 202D respectively pivoted about an axis 203. Referring to Figure 12 it will be seen that the differential pressure carriage 84D for the type W chart has a depending hub 77 and a segmental gear 205D is suitably secured thereto beneath the base 1. The shaft 81 also depends beneath the base and has secured there adjacent its lower end a segmental gear 205S suitably secured thereto. These segmental gears serve to transmit the swinging motion imparted to the cam roller arms by movement of the cams to the differential pressure pen carriage 202D and static pen carriage 202S by means presently to be described for tracing the curves on a type F chart.

Referring to Figures 14 and 15 it will be seen that the assembly 201F comprises an upper plate 206 and a lower offset plate 207 having a corner post 208 integral therewith to form a unitary structure. A suitable ball bearing assembly 209 is secured to pivot 203 and differential pen carrier 202D is pivoted to swing freely thereabout. This carrier has a cutout portion at its outer end for receiving a differential pen arm pivoted therein. At its other end adjacent its pivot is formed integral therewith a segmental gear 211D which meshes with a similar segmental gear 212D loosely pivoted about vertical shaft 213. A spring 214 having one end secured to a projecting eye on gear segment 211D and its other end secured to an eye on gear segment 212D takes up any backlash or play in the meshing of these gears. The gear segment 212D has a hub 215 extending downwardly therefrom to which is suitably clamped a differential pen carrier driven crank 216D.

The static pressure pen carriage 202S is composed of two separate parts, one part being an arm 217 having a cutout portion at its end adapted to receive a suitable pen arm, and having a bore at its other end fitted about a suitable ball bearing assembly 220 on axis 203. The other portion of the static pen carriage comprises an arm 218 having a segmental gear 219S integral therewith at one end, and having a suitable slotted flattened portion 221 at its other end. The two arms constituting the static pen carriage 202S are mounted upon the suitable ball bearing assembly 220 to rotate about axis 203, and are adapted to be pinned together for simultaneous motion by a knurled clamping screw 222 passing through the arcuate slot in flat portion 221 and threaded into arm 217. The segmental gear 219S is meshed with a similar segmental gear 223S having a spacing hub 221 by which it is pinned to the shaft 213 to rotate therewith. A static pressure carriage driven crank 224S also is pinned to the shaft 213 to rotate therewith. A spring 225 similar to spring 214 takes up the backlash between gear segments 219S and 223S. The swinging movements of the static pressure carriage 202S and differential pressure carriage 202D are limited by stop pins 226 and 227 passing through the upper and lower plates 206 and 207 and secured therein. It will be apparent from the foregoing description that by swinging the driven cranks 216D and 224S about their respective pivots the carriages 202D and 202S likewise are swung about the pivot 203.

Referring to Figure 12, through a suitable hole in the base 1 is passed a threaded bushing 230 held in place by a nut 231 threaded thereon. A segmental gear 232D has a hub 233 which passes through a suitable hole in the bushing 230, and at its upper end has suitably clamped thereto a differential pen carriage driving crank 234D. The driving crank 234D is bifurcated at its outer end as indicated at 235 (Figure 1) to receive the depending end of the driven crank 216D which is received between a leaf spring 236 suitably secured to the driving crank as by peening thereto, and a knurled locking screw 237 is threaded into one of the bifurcations. The spring prevents play in the parts at this point, and the screw 237 provides an accurate zero adjustment as will hereinafter appear. A hollow sleeve 239 is journalled within a suitable aperture in the gear hub 233 and is journalled at its lower end in a bracket 238. A thick segmental gear 241S is clamped to sleeve 239 adjacent its lower end to rotate therewith. At the upper end of the hollow sleeve 239 is clamped a static pressure carriage driving crank 242S similar in construction to the driving crank 234D and having a similar bifurcation 239' and zero adjusting screw 240 operating in conjunction with a leaf spring similar to leaf spring 236.

The base is provided with a solid post 245 and a hollow threaded post 246, and in securing the assembly 201F thereto, the reduced portion of post 245 is fitted into hole 247, and the reduced portion of post 246 into hole 244, and the assembly is clamped in place by a knurled clamping screw 243 passing through hole 244 and threaded into the end. The shaft 213 fits loosely into hollow sleeve 239. The static pressure carriage driven crank 224S and the differential pressure carriage driven crank 216D are suitably located with their depending ends in the bifurcations of their respective driving cranks 242S and 234D respectively.

*Operation of type F chart tracing means*

From the foregoing description it will be seen that upon operation of the control arms 92S and 92D the cam carriages 55S and 67D will be shifted as previously described and will swivel pen carriages 87S and 84D about the shaft 81 as a pivot. The swinging movement of carriage 87S is transmitted to the shaft 81 by roller carrier 85S and shaft 81 has the segmental gear 205S at its end. The gear 205S meshing with the wide gear 241S will oscillate the sleeve 239 and driving crank 242S clamped thereto. The driving crank 242S drives the driven crank 224S which is pinned to the shaft 213, and thus drives the segment gear 223S likewise pinned to shaft 213, and which meshes with the gear segment 219S on arm 218 and through the clamping screw 222 drives the pen carrier arm 202S. Oscillation of carriage 84D oscillates segmental gear 205D secured to the hub 77 which in turn drives segmental gear 232D and differential pen carriage driving crank 234D clamped to the hub 233. The driving crank 234D engages the depending end of driven crank 216D and thereby oscillates segmental gear 212D through the hub 215 to which the crank is secured. Gear 212D engages gear 211D integral with the end of the differential pen carriage 202D and oscillates the same about its pivot. The proper proportional movement between the lineal movement of the cam carriages and the static pressure pen carriage 202S and differential pressure pen carriage 202D of the assembly 201F is maintained by proper selection of the radii of the pairs of gears 205D, 232D, and 205S, 241S, so that the movement of the tracing pens on this assembly is always lineally proportional to the movement of the tracing pens on the type W chart tracing assembly. Therefore the corresponding static pressure cam and differential pressure cam used for the integration of the curves of the type W chart curves may be used for integrating the curves on a type F chart.

*Tracing pen assembly for type A charts*

Referring to Figure 16, it will be seen that the radial curves of chart A are made from a point at the right as a center. The pen assembly for integrating type A charts therefore is located at the right end of the machine. Referring to Figures 1 and 12, a bushing 251 is pressed into a suitable hole in the base 1, and a driving dog or crank 254D has an elongated hollow hub 252D which is journalled in said bushing, this dog having a bifurcated end 273. The driving dog 254S has a solid hub 253S which is journalled in the hollow hub 252D, the end of hub 253S extending below the end of hub 252D and being journalled in a bracket 255 secured to the under side of the base 1. An extension arm 256D is clamped to the end of hollow hub 252D, and a similar extension arm 257S is clamped to the solid hub 253S adjacent its end. The gear 232D has adjustably secured thereon a radial extension 258D, (Figure 21) which is slotted adjacent its inner end and is clamped to the gear by suitable set screws so as to be radially adjustable to vary the effective radius thereof. A connecting rod 259D (Figures 2 and 12) is bifurcated at its end, and is pinned to the outer end of extension 258D by a clevis pin 261. Its other end is threaded into a spanning rod 262D and locked against adjustment by a lock nut. A connecting rod 263D is similarly threaded into the other end of spanner rod 262D and has its bifurcated end pinned by a clevis pin 264 to the extension arm 256D. The biasing action of a spring 285 secured at one end to the base 1 and at its other to extension 256D is transmitted through this linkage and keeps roller 86D always in contact with the cam edge of cam group 74D. A similar extension 265S is secured in a similar manner to gear 241S, and a connecting rod 267S bifurcated at one end is pinned by a clevis pin 268 thereto, the other end of connecting rod 267S being adjustably threaded into spanner 269S. A connecting rod 271S is similarly threaded into the other end of spanner rod 269S and has its bifurcated end pinned by a clevis pin 272 to the extension arm 257S secured on hub 253S. A spring 270 similarly keeps the roller 91S against the edges of cam group 62S. Therefore, it will be seen that the swinging movement of segmental gears 241S and 232D, which controls movement of the tracing pens of the chart type F assembly, likewise is transmitted proportionally by means of extensions 265S and 258D, and their respective connecting rods and linkages, to the driving dogs 254S and 254D. The proper proportional movement can be obtained by adjustment of the radial lengths of extension arms 265S and 258D.

The base 1 has at its right end two posts 275 and 276 upon which the pen carriage assembly 277A is mounted. The assembly 277A (Figures 1 and 13) comprises a suitable bracket having an overhanging portion 278 in which is secured a pin 279 having ball bearing assemblies 281 and 282 mounted thereon. The differential pressure pen carrier 283D has a cutout portion at its outer end to pivotally receive the differential pressure pen arm, and has a backwardly and downwardly extending driven crank 284D integral therewith. The static pressure pen carriage 283S is composed of two parts, a longer stylus arm 286 having a cutout portion at its end to swivelly receive the differential pressure pen arm and a shorter supplemental arm or segment 287 having a flattened portion 288 at its outer end with a slot 289 therein, and a knurled screw 291 clamps the upper arm 287 to the lower one 286. This arm 287 likewise has a rearwardly extending and downwardly depending driven crank 292S. The driven cranks 284D and 292S are adapted to be received in the bifurcations of the driving dogs 254D and 254S respectively from which they are driven.

*Operation of type A chart tracing means*

As previously described in connection with the operation of the tracing pens for the type W chart, the operation of the control arms 92S and 92D reciprocates the cam carriages 55S and 67D respectively, which reciprocates the cam groups 62S and 74D respectively secured thereon. The coaction of the cams with the rollers 91S and 86D swings the roller carriers 85S and 89D respectively about the shaft 81 as a center. The key 59 coacting with the bifurcated arm 70S secured to the hub 88 of pen carrier 87S causes swinging of the pen carrier 87S when the roller carrier 85S is oscillated by the cams 62S. The roller carrier 89D is secured to sleeve 78 to which the pen carrier 84D is secured, and oscillation of the roller carrier 89D by the cams 74D causes oscillation of pen carrier 84D. When charts of the type W are to be integrated the assemblies 201F and 277A are removed bodily so as to leave the proper free space for operation of the pen arms 132D and 132S.

When charts of the type F are to be integrated the pen arm assemblies 125D and 125S are removed and the assembly 201F is located in its proper place and secured to the base by the clamping screw 243. The depending ends of driven cranks 216D and 224S fit into the bifurcations 235 and 239', and are held to prevent lost motion by the leaf springs 236 and screws 237 and 240. Upon operation of the control arms 92S and 92D the cam carriages 55S and 67D are reciprocated as before, and the oscillations of roller carriers 85S and 89D are transmitted through the shaft 81 and sleeve 77 respectively to the segmental gears 205S and 205D which cooperate with segmental gears 241S and 232D to cause a proportional swinging of the driving cranks 242S and 234D. This motion is transmitted to the pen arms 202S and 202D through the driven cranks 224S and 216D and segmental gearing in the assembly 201F to cause the pens mounted therein to follow the curves on the chart as the chart is rotated. The integrating operation performed by the integrating discs and wheels will be the same for charts of this type as for charts type W, and it will be observed that because of the proper proportioning of the swinging movement of pen arms 202S and 202D to the swinging movement of the carriages 87S and 84D the same cam can be employed in integrating the type W and type F charts.

When it is desired to integrate type A charts the assembly 201F is removed and the assembly 277A is located in place on the posts 275 and 276 and is clamped in place by a suitable clamping screw 288. When assembled the rearwardly depending driven cranks 284D and 292S are located in the bifurcations 273 and 274 of the driving cranks 254D and 254S respectively. The oscillating motion of segmental gear 241S is transmitted through the connecting extension 265S and connecting rod 267S pivoted thereto, and through spanner 269S and connecting rod 271S to arm 257S which is clamped to the hub of driving crank 254S. The oscillating motion of segmental gear 232D is transmitted through extension 258D and connecting rod 259D pivoted thereto, spanner 262D and connecting rod 263D, to the arm 256D secured to the hollow hub of driving crank 254D. By adjusting the lengths of extensions 258D and 265S a proper proportional movement can be secured between the oscillating motion of gears 241S, 232D, and driving cranks 254S and 254D, and consequently between the cam groups 62S, 74D and the driving cranks 254S, 254D. Therefore, the same cams can be used in integrating type A charts.

*Calibrating and adjusting*

In the original calibration of the machine it is necessary to determine proper ratios to be allowed between revolutions allowed for registering static pressure values, and for differential pressure values. The ratios are set as a matter of convenience, and are calculated from the multiplier decided on for the machine. Preferably, the machine is so designed that the multiplier is 1.0 when integrating a 100 lbs. static pressure chart with atmospheric pressure taken as 14.4 lbs. per square inch. Having determined a maximum number of revolutions of idler disk 64 to be allowed for the maximum pressure shown on the chart, it is now necessary to calculate the ratio between these maximum revolutions, and twenty-four hours multiplied by the square root of the maximum absolute pressure shown by the chart. Having arrived at this factor it is easy to determine at what value in revolutions the plate 64 should turn for twenty-four chart hours on any absolute pressure circle on the chart. The static carriage is now adjusted to the point which will give the predetermined revolution value for any particular absolute pressure value. Cam 62S is mounted on the carriage, the pen is placed on the particular pressure which is being calculated, and a punch mark is placed on the cam to indicate the center of the cam roller, which will give the position of the contour of the cam for this pressure. After a large number of points on the cam have been determined in this manner the curve may be scribed on the cam, and the cam cut to shape.

Having completed the static cam the static pressure pen is set and locked with the carriage in position on a known value of static pressure, then with this value of static known, the value of the extension desired can be computed for each of a number of values of differential, and the process of laying out the differential cam carried out in the same manner in which the static cam was laid out.

After the cams 62a and 74a are calibrated for the type W charts the movement between the type W assembly and type F assembly must be adjusted so that the pens of the respective assemblies are in accord. The pen carriers 125S and 125D are removed, and a type F chart is placed upon the platen. By setting the cam carriages 55S and 67D at their respective left hand limits of movement, which would bring the pens 132D and 132S at the atmospheric pressure circle of a type W chart were they in place, the pens of the type F assembly likewise should lie on the atmospheric pressure circle. If they do not, the gear segments 205D and 205S are released and rotated relative to the hub 77 and shaft 81 until the pens are in proper position, and the gears are then firmly clamped in place. The gear ratios of pairs of gears 205D, 232D and 205S, 241S is such that when the pens of the type F assembly are at the outer circle of the type F chart the pens of the type W assembly likewise would lie on the outer circle of the type W chart.

In the case of the type A pen assemblies the same procedure is followed. If the movement of the pens of this assembly is properly proportioned to the movement of the pens of the type W assembly, but the atmospheric pressure positions do not correspond, the arms 256D and 257S can be rotated relative to the driving dogs 254D and 254S to bring the pens to their proper position, or, the lengths of connecting rods 259D and 267S can be adjusted. To adjust the proper proportioning of the pen movement the arms 258D and 265S can be adjusted radially on their respective gears whereby the correct proportioning between these arms and arms 256D and 257S respectively is accomplished.

Occasionally the pen arms may be sprung in mishandling the machine, and provision is made for adjusting the pens to its proper zero position in such instances. Referring to Figure 1, it will be seen that the differential pressure pen carrier 125D has two parts one of which numbered 128 is reduced to provide a spring action, and this part carries the tracing pen 132D at its outer end The other part 127 of this arm is rigid. When the control arm 82D is placed in its extreme position the tracing pen 132D should coincide with the zero circle. If it does not, the adjusting screw 150 is rotated to force the posts 127 and 128 further apart or closer together as is required to shift the tracing pen without affecting any movement of the roller 86D in relation to the cam groups 74D. The static pressure pen 132S likewise can be adjusted by turning the knurled screw 149 to set the pen at the proper zero position.

Provision is made for integrating charts of various static pressure ranges. Referring to Figure 16, it will be seen that the space between the extreme inner and outer circles of these charts hereinafter referred to as the pen travel, represents a static pressure of 100 pounds gauge, or 6.94 atmospheres. When charts are employed for other static pressures the diameter of the inner circle is the same for a given type chart, and the distances between the inner and outer circle remains the same, but instead of this distance representing 6.94 atmospheres it would represent some other given static pressure, as for example 500 pounds or 34.72 atmospheres. The same pen travel in one case will represent 6.94 atmospheres, and in the other case will represent 34.72 atmospheres. Because the inner circle represents atmospheric pressure and the laws relating to behavior of gases are based upon the absolute pressure of the gases, it will be seen that the absolute zero of a 500 pound static pressure chart of the same type would not be the same radial distance from the center as the absolute zero for a 100 pounds static pressure chart. The square root law of the cam is based on atmospheres. Therefore for a 500 pound pressure range chart an adjustment is provided such that when the stylus point is at the atmospheric pressure circle the roller 91S is at a point on the cam equivalent to $$\frac{34.72}{6.94}$$

or 5 atmospheres.

For this adjustment, the flattened portion 141 of the pen arm 125S has a plurality of holes 142 drilled therethrough, these holes being accurately positioned and marked to indicate different static pressure ranges. To adjust the pen arm for a different static pressure range it is necessary only to release locking screw 146, remove the tapered pin 144 from one of these holes 142, and bring the desired hole 142a in registry with the single hole 143 in the arm 126 and reinsert the tapered pin 144 and tighten locking screw 146. The static pressure tracing pen thereby will be properly zeroed in relation to the cam for integrating a different static pressure range chart. It will be noted that the pen assembly 125S is made up of two separate and relatively movable parts, and the movement of parts 126 and 134 relative to each other by knurled screw 149 likewise shifts the relation of roller 91S to the cam groups 62S. However, the static pressure range adjustment differs from knurled screw zero adjustment in that the latter is used only to make the stylus point coincide with the inner chart circle when the cam is at one end of its travel, and therefore does not shift the relation of roller 91S to the cam edge.

The adjustment of the pen carrier 202S for various static pressure ranges is the same as in the case of the pen arms for the type W chart. The clamping screw 222 is released and pin 221 is removed. Arm 217 then can be rotated while arm 218 remains fixed by crank 224S engaging dog 242S, and when the proper holes are brought into registry pin 221 is reinserted and clamping screw 222 is tightened. The zeroing adjustment for the pen arms 202S and 202D is accomplished by proper adjustment of knurled screws 237 and 240, this adjustment being intended for compensating for accidental springing of the pen arms after the mechanism has been adjusted. To adjust the pens in assembly 277A (Figures 1 and 13) for various static pressure range charts, the clamping screw 291 is released and pin 144 is removed thereby permitting arm 286 which carries the pen to be rotated while arm 287 remains held by crank 292S engaging dog 254S. Arm 286 is rotated to bring the proper hole in flat portion 288 into registry with hole 143. The pin 144 is then reinserted, and clamping screw 291 is tightened to clamp arms 286 and 287 together.

*Multiple cam mechanisms*

The apparatus so far described is designed to integrate the curves on various types of charts referred to as types W, F and A, all of which have a uniform division of the space between the extreme inner and outer circles, and in integrating such charts the same static pressure cam is used in integrating the various static pressure curves, and the same differential pressure cam is used in integrating the various differential pressure curves. The charts illustrated in Figure 16 are known as uniform charts, and the law of operation of the orifice meter pen which traces the curves on these charts is such that a direct proportion exists between the pressure and the radial movement of the recording pen. Some orifice meters do not have the recording pen operating at a uniform radial ratio to the pressure, and instead have the chart marked off by non-uniform spaces to compensate for this deviation. Such charts are known as non-uniform charts and a different pair of static pressure and differential pressure cams on the carriages are required for integrating charts of this type. Still another type of chart encountered in practice measures vacuum as well as positive pressure, and a separate static pressure cam is required in integrating this type of chart.

The cam carriages 55S and 67D are equipped with a plurality of cams for integrating these types of charts as well as other types that may be found in practice, and a mechanism is provided for shifting the relation between the individual cams and the cam rollers adapted to coact therewith. This mechanism will now be described. Referring to Figures 9 and 12, the roller carrier 85S is clamped to the shaft 81, while the roller carrier 89D is clamped to the sleeve 78 in which the shaft 81 is freely rotatable and longitudinally slidable. By vertically shifting the shaft 81 the roller carrier 85S is vertically shifted bringing the roller 91S into working contact with the edge of any desired one of the cams constituting group 62S. The mechanism for shifting the carriage comprises an eccentric 305 mounted upon a shaft 306 and adapted to bear against the spring 83 where it bears against the lower end of shaft 81. The bracket 52 has a depending post 307 passing through a suitable hole in the base, and this post has a hole 308 adjacent its lower end in which the shaft 306 is journalled, the movement of the shaft being limited in one direction by the collar 311 suitably secured thereto, and being limited in the opposite direction by a collar 312. A ratchet wheel 313 is suitably secured to the shaft 306 and has a plurality of notches or teeth 314 therein which coact with a spring pawl 315 suitably secured to the bottom of the base for holding the shaft 306 and eccentric 305 in fixed position. The shaft 306 can be rotated by the operative by means of an operating arm 316 having a knurled handle and pointer 317 for cooperating with indices on the plate 318 secured in a recess on the base. It will be seen that the weight of the shaft 81 is partially supported by the spring 83. At the top adjacent bracket 52 is located a coil spring 319 within the hollow sleeve 78, this spring being retained by the plate 321 secured by screws or other suitable means to the bracket 52. The other end of spring 319 coacts with a thrust disc 322 and ball 323 resting on the upper end of shaft 81, whereby the shaft is urged downwardly, the springs 83 and 319 being suitably balanced. An annular groove 324 is formed in the shaft 81 adjacent its upper end for a purpose to be later described.

By rotation of shaft 306 the eccentric 305 is rotated, and as it bears against spring 83 at the lower end of shaft 81 the various positions of the eccentric will shift the shaft 81 vertically, and with it the roller carrier 85S and roller 91S secured thereto, to various positions predetermined by the spacing of the ratchet teeth 314 in disc 313, and the shaft 81 will be held in such position by coaction of spring pawl 315 and ratchet teeth 314. The ratchet teeth 314 are so spaced as to provide that the roller 91S and its carriage is shifted vertically a distance equal to the width of one cam for each tooth whereby any one of the four static pressure cams shown may be contacted at one time by roller 91S in integrating the corresponding type of chart.

The roller carrier 89D is not vertically movable. However, the roller 86D may be vertically shifted by the following means. The roller 86D is rotatable on a pivot pin 86', suitable ball bearings being interposed to eliminate friction, and the pivot pin 86' has adjacent its upper end a flange 325 to which a bent wire 329 is secured. A spring 326 is interposed between the flange 325 and the top of the carrier 89D to bias the pin 86' upward. A rocker structure 327 has depending arms 328 swivelly secured to the sides of roller carrier 89D, and has a spherical bearing member 331 at its end bearing upon the flange 325 of the pin 86'. The wire 329 coacts with a slot 330 in the rocker 327 to prevent rotation of the pin 86'. A rod 334 is threadedly locked in adjusted position to the rocker 327, and its other end 332 passes through a suitable hole in the roller carriage 89D and sleeve 78, and bears against the surface of shaft 81, the spring 326 biasing the end 331 upward and forcing the end 332 of rod 334 against the surface of the shaft 81.

When the shaft 81 is shifted vertically upward to the first notch in ratchet 314 the biasing action of spring 326 urges the end 332 of rod 334 into the groove 324 thereby permitting the axis 86' and roller 86D rotatable thereon to be shifted vertically upward and contact the edge of cam 74b. At the same time the roller carrier 85S will be shifted upward causing the roller 91S to contact with the edge of cam 62b. In this position the mechanism is in proper adjustment for integrating a non-uniform type of chart not specifically described herein.

In the non-uniform type of chart a special cam must be employed for the static pressure curve as well as for the differential pressure curve and the cams 62b and 74b therefore may be referred to as non-uniform cams. However, on the vacuum-pressure type of chart heretofore mentioned a uniform differential pressure cam can be employed, and it is necessary only that a different static pressure cam indicated as 62c be used. Therefore it is necessary that the roller carrier 85S be shifted for cooperation between roller 91S and cam 62c, while the roller 86D be shifted back to cooperate with uniform cam 74a. When the shaft 306 is rotated to the next notch the carriage 85S is shifted upward causing roller 91S to contact cam 62c while the end 332 of rod 334 is forced out of groove 224 thereby pressing pin 86' downward to cause roller 86D to contact cam 74a.

Upon further upward shifting of the shaft 81 a distance represented by the fourth notch 314 the roller 91S is brought into operative contact with the upper cam 62d, but the rod 334 remains in unchanged position in contact with the surface 2 of the shaft 81, and therefore the roller 86D is not shifted but remains in contact with the edge of cam 74a for integrating another type of chart. In each case the integration of the curves on the various charts is performed exactly as previously described, the operative manipulating the control arms 92S and 92D to shift the cam groups 62S and 74D, and thereby cause the tracing pens to follow the curves on the chart.

In the modification shown in Figures 18, 19 and 20, a different type of linkage is employed for transmitting motion from the type W tracing point center to the type F tracing point center. In this modification wherein corresponding parts are indicated by the same reference characters hereinbefore used, the pen carriages 87S and 84D have extensions 341S and 342D respectively which have the bifurcated links 343S and 344D pivotally secured thereto. The type F pen assembly, indicated generally by the numeral 345F, comprises two segmental gears 346S and 347D to which are pivoted the links 343S and 344D respectively. The segmental gears 346S and 347D are suitably pivoted on anti-friction bearings about a pivot 349 held in place by a clamping screw 360 in a bracket 348, and coact with segmental gears 351S and 352D integral with the static pressure pen assemblies 353S and differential pen arm 354D respectively. The pen assemblies 353S and 354D are substantially the same in construction as assemblies 202S and 202D respectively.

A flanged bushing 350 is located in a suitable hollow post on the base 1, and a hollow shaft 355D extends therethrough. The gear segment 347D is pinned to the upper end of hollow shaft 355D, and an arm 356D is secured to the bottom thereof, said arm having a slotted radially adjustable portion secured thereto by set screws or similar means. A solid shaft 357S extends through hollow shaft 355D, and has the gear segment 346S pinned thereto, an arm 358S being secured to the lower end of this shaft. Arm 358S is similar in construction to arm 356D. The motion of gears 346S and 347D is transmitted through the arms 358S and 356D to the connecting links 361D and 359S respectively pivoted thereto, to the type A chart pen assembly. The springs 362 and 363 are secured at one end to post 364 and at their other ends to gears 351S and 352D respectively for taking up backlash in the gear pairs 346S, 351S and 347D, 352D.

A bushing 365 is located at the right end of the base 1, and a driving dog 366D having a hollow hub 367D is journalled therein. An arm 368D is suitably pinned to the hub 367D and the other end of link 361D is pivotally secured thereto. The driving dog 369S has a solid hub 371S passing through the hub 367D, and at its lower end is pinned an arm 372S to which the other end of link 359S is pivotally secured. It will be apparent, therefore, that the driving dogs 366D and 369S are operated from the segmental gears 347D and 346S, which in turn are operated from carriages 87S and 84D.

The pen assembly 372A comprises a hollow bushing 373D having a driven crank 374D integral therewith, and a differential pen carrier 375D at its upper end integral therewith. The static pen assembly 376S is composed of two arms, an upper arm 377 pinned to the shaft 378 which extends through bushing 373D and partially through hub 371S, and a lower arm 379 swivelled thereabout. A driven crank 381S is pinned to the shaft 378 to rotate therewith. The ends of driven cranks 381S and 374D fit into the bifurcations of driving dogs 369S and 366D from which they are driven.

In this modification it will be apparent that the motion of the type W pen carriers is transmitted by pivoted links of fixed length, instead of by gears, to the type F pen assembly, and therefore is not directly proportional, and the arcuate motion of the pen carriers of the type F assembly will be transmitted proportionately substantially as previously described to the type A assembly. The pair of uniform cams 62a and 74a are employed in integrating type W charts. Because the motion of the type F tracing pens and type A tracing pens are not proportional to the motion of the type W tracing pens a separate pair of uniform cams 62e and 74e are employed in integrating the latter charts, said cams being of proper shape to compensate for the actual proportional motion. The mechanism for shifting the cam rollers 381D and 382S is substantially as previously described, the ratchet disc 383 having only two notches 384 and 385. Upon rotation of shaft 306 to bring the spring pawl 315 into registry with notch 385 the cam roller 382S will be brought into contact with cam 62e, and cam roller 381D will be brought into contact with cam 74e.

The integration of charts is carried out on this modification as previously described. The assembly 345F can be removed when not in use by removing the bracket 348 which is held clamped on the case 1 by the clamping screw 360. This bracket carries the gears 351S and 352D integral with the static pressure curve tracing pen arm 353S and differential pressure curve tracing pen arm 354D, so that the whole assembly 345F can be removed or replaced as a unit, the gears 351S and 352D being properly meshed with gears 346S and 347D upon replacement of the assembly.

In Figure 22 is shown a preferred embodiment of a divider 386 for correcting constant errors in the orifice meter charts which may be due to loss of mercury, or permanent distortion of the recording pen arm. The divider comprises a bifurcated spring member having the spring arms 387 and 388, the former terminating in a point 389 on a level with the point 390 of pen 391. The other arm 388 has a sleeve 392 fitting closely over the shank of the pen 391 and a set screw 393 clamps the divider to the pen. The distance between the points 389 and 390 can be adjusted by turning the adjusting nut 394 on screw 395.

In operation, the divider is placed upon a tracing pen on the integrator, and the distance between the points 389 and 390 is adjusted to the desired distance. In integrating a curve on the chart the curve is traced by the point 389 instead of by the pen, and the pen records on the chart a legible curve representing the true compensation for the orifice meter error at the same time as the integration takes place.

The invention may be embodied in other specific forms without departing from the spirit or essential characteristics thereof. The present embodiment is therefore to be considered in all respects as illustrative and not descriptive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A machine for integrating charts comprising chart supporting means, counting means, means for actuating said counting means, tracing means, means connecting said actuating and tracing means for causing variations in the rate of actuation of said counting means in accordance with the operation of said tracing means, means for varying the locus of said tracing means to predetermined positions, said tracing means being connected in its varied positions to said connecting means.

2. A machine for integrating charts comprising chart advancing means adapted to receive a chart having a curve thereon to be integrated, a stylus arm carrying a stylus and operating from a fixed pivot for following the curve to be integrated, a counter, means variably driving said counter in accordance with the movement of said stylus to register on said counter the integral of the square root of said curve, means to receive a second stylus arm operating from a second fixed pivot for use in integrating other types of charts, and a proportional motion transmission means operatively connecting said stylus arm and said last named means for maintaining the angular motion of said arms proportional.

3. A machine for integrating charts comprising chart advancing means adapted to receive a chart having a curve thereon to be integrated, means operating from a fixed pivot and adapted to operate a stylus for following the curve to be integrated, a counter, counter driving means variably operated in accordance with the movement of said stylus operating means to register on said counter the integral of the square root of said curve, means operating from a second fixed point adapted to operate a second stylus for tracing a curve on other types of charts, and means adapted to connect said second stylus operating means with said counter driving means, to register on said counter the integral of the square root of the curve on said other types of charts.

4. A machine for integrating charts comprising chart advancing means adapted to receive a chart having curves thereon to be integrated, means operating from a fixed pivot through a limited arc and adapted to operate a stylus for following the curve to be integrated, a counter, means variably driving said counter in accordance with the movement of said stylus operating means to register on said counter the integral of the square root of said curve, means operating from a fixed pivot through a different limited arc adapted to operate a second stylus for use in integrating other types of charts, and motion transmission means operatively connecting said styli operating means for maintaining the angular motion thereof proportional in the ratio of their respective arcs of movement.

5. A machine for integrating charts comprising chart advancing means adapted to receive a chart having curves thereon to be integrated, means operating from a fixed pivot through a limited arc and adapted to operate a stylus for following the curve to be integrated, a counter, means variably driving said counter in accordance with the movement of said stylus operating means to register on said counter the integral of the square root of said curve, means operating through a different limited arc of reverse curvature from a different fixed pivot adapted to operate a second stylus for use in integrating other types of charts, and motion transmission means operatively connecting said styli operating means for maintaining the angular motion thereof proportional in the ratio of their respective arcs of movement.

6. A machine for integrating charts comprising chart advancing means adapted to receive a chart having a curve thereon to be integrated, chart tracing means having a fixed law of operation and including a stylus for following the curve to be integrated, means variably driven in accordance with the movement of said chart tracing means to integrate the curve, a second chart tracing means having a different fixed law of operation for use in integrating other types of charts, and motion transmission means operatively connecting said chart tracing means for maintaining the motion thereof proportional.

7. An apparatus as defined in claim 6 in which said motion transmission means comprises intermeshing gears of different diameters.

8. An apparatus as defined in claim 6 in which said motion transmission means comprises links and radial arms of different lengths.

9. A calculating machine comprising a movable chart plate adapted to receive a chart having a curve thereon to be integrated, means operating from a fixed pivot and operating a stylus for following the curve to be integrated, integrating means variably driven in accordance with the movement of said stylus operating means to integrate said curve and including a cam and means contacting said cam for guiding the movement of said stylus operating means, a second means operating from a second fixed pivot adapted to operate a second stylus for integrating other types of charts, and means connecting said contacting means and said second stylus operating means for guiding the movement of said second stylus operating means.

10. A calculating machine comprising a movable chart plate adapted to receive a chart having a curve thereon to be integrated, means operating from a fixed pivot and operating the stylus for following the curve to be integrated, a counter, a plurality of relatively movable peripherally engaging members for driving said counter, means including a cam for manually moving said stylus and for varying the engagement of at least one of said peripherally engaging members with the others, means operating from a second fixed pivot adapted to operate a second stylus for integrating other types of charts, and means adapted to connect said second stylus operating means with said cam.

11. A calculating machine comprising a movable chart plate adapted to receive a chart having a curve thereon to be integrated, means operating from a fixed pivot and operating a stylus for following the curve to be integrated, a counter, counter driving means, a substantially square root cam for varying the movement of said counter driving means in accordance with the movement of said stylus operating means to register on said counter the integral of the square root of said curve, a second means operating from a second fixed pivot adapted to operate a second stylus for use in integrating other types of charts, and motion transmitting means operatively connecting said styli operating means for maintaining the angular movement thereof proportional.

12. A calculating machine comprising a movable chart plate adapted to receive a chart having a curve thereon to be integrated, means operating from a fixed pivot and operating a stylus for following the curve to be integrated, integrating means variably driven in accordance with the movement of said stylus operating means to integrate said curve and including a plurality of cams, means contacting one of said cams for guiding the movement of said stylus operating means, a second means operating from a second fixed pivot adapted to operate a second stylus for use in integrating other types of charts, motion transmitting means operatively connecting said styli operating means, and shifting means for causing contact between said contacting means and a different cam for integrating said other types of charts, said motion transmitting means remaining in operative relation during the shifting operation.

13. A calculating machine comprising a chart plate adapted to receive a chart having differential pressure and static pressure curves thereon, a pair of means for carrying styli adapted to follow said respective curves, means variably driven in accordance with the movement of said styli to indicate the integral of the product of the square roots of said curves, a second pair of means for carrying styli adapted for use in integrating differential pressure and static pressure curves of different types of charts, and motion transmitting means operatively connecting said pairs of means respectively for maintaining the motion thereof proportional.

14. A calculating machine comprising a chart plate adapted to receive a chart having differential pressure and static pressure curves thereon, a pair of means for carrying styli adapted to follow said respective curves, means variably driven in accordance with the movement of said styli to indicate the integral of the product of the square roots of said curves, and including a substantially square root cam, a second pair of means for carrying styli adapted for use in integrating differential pressure and static pressure curves of different types of charts, and motion transmitting means operatively connecting said pairs of means respectively for maintaining the motion thereof proportional.

15. A calculating machine comprising a chart plate adapted to receive a chart having differential pressure and static pressure curves thereon, a pair of means for carrying styli adapted to follow said respective curves, means variably driven in accordance with the movement of said styli carrying means to indicate the integral of the product of the square roots of said curves, a second pair of means for carrying styli adapted for use in integrating differential pressure and static pressure curves of different types of charts, proportional motion transmitting means operatively connecting said pairs of styli carrying means respectively for maintaining the motion of said styli proportional, a third pair of means for carrying styli adapted for use in integrating differential pressure and static pressure curves of a third type of chart, a reversing motion transmitting means operatively connecting said second and third pairs of styli carrying means for maintaining the motion of said third pair of styli reversely proportional.

16. A calculating machine comprising a chart plate adapted to receive a chart having differential pressure and static pressure curves thereon, a pair of means for carrying styli adapted to follow said respective curves, means variably driven in accordance with the movement of said styli to indicate the integral of the product of the square roots of said curves, a second pair of means for carrying styli adapted for use in integrating differential pressure and static pressure curves of different types of charts, motion transmitting means operatively connecting said pairs of styli carrying means respectively, a third pair of means for carrying styli adapted for use in integrating differential pressure and static pressure curves of a third type of chart, and motion transmitting means operatively connecting said second and third pairs of styli carrying means respectively for maintaining the motion of said third pair of styli carrying means reversely proportional to the movement of said first pair.

17. A calculating machine comprising a chart plate adapted to receive a chart having differential pressure and static pressure curves thereon, a pair of means for carrying styli adapted to follow said respective curves, means including a plurality of cams variably driven in accordance with the movement of said styli to indicate the integral of the product of the square roots of said curves, means contacting a pair of said cams for guiding the movement of said pair of styli carrying means, a second pair of means for carrying styli adapted for use in integrating differential pressure and static pressure curves of different types of charts, motion transmitting means operatively connecting said pairs of styli carrying means respectively, and shifting means for causing contact between said contacting means and a different pair of cams for integrating said other types of charts, said motion transmitting means remaining in operative relation during the shifting operation.

18. A calculating machine comprising a movable chart plate adapted to receive a chart having a curve thereon to be integrated, a stylus holder, a stylus carried thereby adapted to follow the curve to be integrated, a counter, means variably driving said counter in accordance with the movement of the stylus to register on said counter the integral of the square root of said curve, and a connection between said holder and stylus adjustable to predetermined positions to adjust the counter driving means for various zero positions of curves of various static pressure range charts.

19. A calculating machine comprising a movable chart plate adapted to receive a chart having a curve thereon to be integrated, a stylus holder, a stylus carried thereby adapted to follow the curve to be integrated, a counter, means variably driving said counter in accordance with the movement of the stylus to register on said counter the integral of the square root of said curve, a connection between said holder and stylus adjustable to predetermined positions for varying the relation between the stylus and said means to compensate for various zero positions of curves of various static pressure range charts, and an adjustable connection between said holder and stylus for compensating for accidental non-registration of the stylus to predetermined zero positions.

20. A calculating machine comprising a movable chart plate adapted to receive a chart having a curve thereon to be integrated, a stylus arm carrying a stylus, means carrying said stylus arm and adapted to follow the curve to be integrated, a counter, means variably driving said counter in accordance with the movement of the stylus to register on said counter the integral of the square root of said curve, a supplemental arm connected to said stylus arm carrying means, and an adjustable connection between said stylus arm and supplemental arm to adjust the counter driving means for various zero positions of curves of various static pressure range charts.

21. A calculating machine comprising a movable chart plate adapted to receive a chart having a gas pressure curve thereon to be integrated, a stylus arm carrying a stylus, means carrying said stylus arm and adapted to follow the curve to be integrated, a counter, means variably driving said counter in accordance with the movement of the stylus arm carrying means to register on said counter the integral of the square root of said curve, a stop limiting movement of said counter driving means, a supplemental arm connected to said stylus arm carrying means, and an adjustable connection between said stylus arm and supplemental arm to adjust the counter driving means for various zero pressure positions of curves of various static pressure range charts.

22. In an apparatus of the character described, a base having a plurality of slide bars secured thereon, a plurality of cam carriages slidable on said slide bars and carrying cams, an axially movable shaft journalled in said base and having a groove therein, a member clamped to said shaft and adapted to contact a cam on the corresponding one of said carriages, a second member swiveled about said shaft, means thereon for contacting a cam on another corresponding one of said carriages, means for shifting said shaft longitudinally, and a detent adapted to fit into said groove to shift said latter cam contacting means.

23. In an apparatus of the character described, a base having a plurality of slide bars secured thereon, cam carriages slidable on said slide bars and carrying cams, an axially movable shaft journalled in said base, said shaft having a groove therein, a member clamped to said shaft and adapted to contact a cam on the corresponding one of said carriages, a static pressure pen carrier adapted to contact said member, a differential pressure pen carrier swiveled about said shaft, a second member swiveled about said shaft to move with the differential pressure pen carrier, means thereon for contacting a cam on another corresponding one of said carriages, means for shifting said shaft longitudinally, and a detent adapted to fit into said groove to shift said latter cam contacting means.

24. In an apparatus of the character described, a base having a plurality of slide bars secured thereto, cam carriages slidable on said slide bars and carrying cams, an axially movable shaft journalled in said base and having a groove therein, means for urging the shaft axially in one direction, means for limiting axial movement of said shaft in said direction, a member clamped to said shaft and adapted to contact a cam on the corresponding one of said carriages, a static pressure pen carrier swiveled about said shaft and contacting said member, a differential pressure pen carrier swiveled about said shaft, a second member secured to move with said differential pen carrier and having means thereon for contacting the cam on another corresponding one of said carriages, a rocker for shifting said cam contacting means, means for shifting said shaft longitudinally to predetermined positions, and a detent adapted to fit into said groove to shift said rocker and said latter cam contacting means.

25. A chart calculating machine comprising a base having a chart plate rotatably journalled thereon, a time disk journalled in said base and rotated in synchronism therewith, a pair of brackets on said base, a plurality of slide bars secured between said brackets, a static pressure cam carriage slidable on one of said slide bars and carrying a wheel peripherally contacting said time disk, an idler wheel pivotally supported between said brackets and contacting said first wheel, a differential cam carriage slidable on another of said slide bars and carrying a counter wheel contacting said idler wheel, an axially movable shaft journalled in one of said brackets and having a groove clamped therein, a member clamped to said shaft and adapted to contact a cam on the static pressure cam carriage, a static pressure pen carrier swiveled about said shaft and contacting said member, a differential pressure pen carrier swiveled about said shaft, a second member secured thereto and carrying an axially movable roller for contacting a cam on the differential cam carriage, a rocker mounted on the said second member for axially shifting said roller, means for shifting said shaft longitudinally, and a detent adapted to fit into said groove to shift said rocker and cam roller.

26. An apparatus as defined in claim 20 in which said adjustable connection comprises a plurality of accurately positioned holes in one of said arms adapted to register with a hole in the other of said arms, and a removable pin for maintaining said holes in registration.

27. An apparatus as defined in claim 20 in which said adjustable connection comprises a plurality of accurately positioned holes in said stylus arm adapted to register with a hole in the supplemental arm, a removable pin for maintaining said holes in registration, and means to positively clamp said arms in adjusted positions.

28. A calculating machine comprising a chart plate adapted to receive a chart having differential pressure and static pressure curves thereon, an arm carrying a stylus, means carrying said stylus arm and adapted to follow the differential pressure curve, a static pressure stylus arm carrying a stylus, means carrying said static pressure stylus arm and adapted to follow the static pressure curve, a counter, means variably driving said counter in accordance with the movement of said styli to register on said counter the integral of the product of the square roots of the curves, a supplemental static pressure arm connected to said static pressure stylus arm carrying means, and an adjustable connection between said static pressure stylus arm and said supplemental static pressure arm to adjust the counter driving means for various atmospheric pressure positions of curves of various static pressure range charts.

29. A calculating machine comprising a chart plate adapted to receive a chart having differential pressure and static pressure curves thereon, differential pressure and static pressure arm carrying means operating a pair of arms carrying styli adapted to follow the respective curves, a counter, means variably driving said counter and including a static pressure cam and a differential pressure cam, means contacting said cams for guiding the movement of said static pressure and differential pressure arm carrying means respectively, a supplemental static pressure arm, and an adjustable connection between said static pressure stylus carrying arm and said supplemental static pressure arm to adjust the counter driving means for various zero pressure positions of curves of various static pressure range charts without affecting said cam contacting means.

30. In a calculating machine, a rotary member adapted to receive a chart having a static pressure curve thereon, an arm carrying a tracing point adapted to follow said pressure curve and having at least one hole therein, a pressure range segment having a plurality of holes therein in predetermined positions, a registry pin passing through certain of said holes in registry, and means to clamp said arm and segment in adjusted position.

31. A calculating machine comprising a rotary member adapted to receive a chart to be integrated, a counter, power means to drive said counter, variable motion transmitting means between said power means and counter, a pivoted plate connected to said variable motion transmitting means, a tracing point, a pivoted arm carrying said tracing point, and means for angularly adjusting said plate and arm to a plurality of predetermined positions for adjusting the motion transmitting means in accordance with the zero pressure positions of corresponding static pressure range charts.

32. In a machine for integrating meter charts, a plurality of movable tracing point actuators interconnected with a counter actuating mechanism for causing variations in the speed of said mechanism as said tracing point actuators are moved, said tracing point actuators being adapted to selectively receive a plurality of tracing points having different loci adapted to trace over charts for meters of different character, and means for adjusting at least one of said tracing points to a plurality of predetermined positions relative to and independently of said tracing point actuators and counter actuating mechanism interconnection for integrating charts having various static pressure ranges.

33. In an integrating mechanism, a base member, a gear casing adapted to be secured thereto and having a driving disc mounted on a shaft therein, a drive shaft and intermeshing gearing between said shafts, a motor adjustably mounted on said gear case for impositively driving said drive shaft, a chart plate rotatably mounted on said base, a line shaft driven from said disc shaft, and gearing including a frictional connection between said line shaft and chart plate for driving the chart plate.

34. A tracing pen assembly adapted to be mounted on a base comprising a bracket having a static pressure tracing pen arm assembly and a differential pressure tracing pen arm pivotally mounted upon a common axis, said arms having gear teeth integral therewith adjacent said axis, a pair of separately pivoted gear segments meshing with said gear teeth, a post on said bracket, and spring means between said post and arms for biasing said arms in one direction.

35. A tracing pen assembly adapted to be mounted on a base comprising a frame having a static pressure tracing pen arm assembly and a differential pressure tracing pen arm pivotally mounted upon a common axis, said arms having gear teeth integral therewith adjacent said axis, a pair of segmental gears rotatable about a common center and meshing therewith, driven cranks for driving said segmental gears, and means for securing said assembly to said base.

36. A tracing pen assembly adapted to be mounted on a base comprising a frame having a static pressure tracing pen arm assembly and a differential pressure tracing pen arm pivotally mounted upon a common axis, said arms having gear teeth integral therewith adjacent said axis, a rotatable shaft journaled in said frame, a segmental gear pinned to said shaft and adapted to mesh with the teeth of one of said arms, a driven crank pinned to said shaft, a second segmental gear freely rotatable about said shaft and having a hub, and a driven crank secured to said hub.

37. A driving dog having a hollow hub and adapted to be rotatably journalled in a base, a segmental gear secured to the lower end of said hub, a second driving dog having a hub adapted to rotatably fit in said hollow hub, a second segmental gear secured to the lower end of said second hub, and a pen assembly comprising a static pressure and a differential pressure pen arm having driven cranks adapted to be driven by said dogs.

38. In a calculating machine for integrating a curve on a chart, a member adapted to receive a chart having a curve thereon, at least one tracing point movable over the chart to trace said curve, a pivoted oscillatory arm supporting said tracing point, a counter, an oscillatory segment, means for varying the drive of said counter in accordance with the position of said segment, and means for securing said oscillatory arm to said segment in a plurality of predetermined angular positions.

39. In a calculating machine for integrating curves on a chart, a member adapted to receive a chart having curves thereon, tracing points making a visible tracing as they pass over the chart to be calculated, a divider fitted to one of said tracing points having a stylus, means to accurately adjust the distance between said stylus and tracing point, means for holding said stylus and tracing point in adjusted position whereby as the stylus traces over the curve the tracing point records a curve constantly corrected for errors, a counter, and means variably driving said counter in accordance with the movement of the stylus to correct and integrate the square root of the products of said curves in accordance with the visible tracing.

40. In an apparatus of the character described, a base having a cam carriage slidably mounted thereon, at least one cam on said carriage, an axially movable shaft journalled in said base, a member secured to said shaft and adapted to contact a cam on said carriage, a second shaft journalled in said base, means for longitudinally shifting said first shaft, and connecting means between said shafts for maintaining engagement in shifted position.

41. In an apparatus of the character described, a base having a rotary member journalled therein, a wheel mounted to move across said rotary member, a carriage for guiding said wheel there being at least one cam on said carriage, an axially movable shaft journalled in said base, a member secured to said shaft and adapted to contact a cam on said carriage, a second shaft journalled in said base, means for shifting said first shaft, and connecting means between said shafts for maintaining engagement in shifted position.

42. In an apparatus of the character described, a base having a cam carriage slidably mounted thereon and carrying at least one cam, an axially movable shaft journalled in said base, a member secured to said shaft and adapted to contact a cam on said carriage, a second shaft rotatably journalled in said base, a third shaft journalled in said base, means rotatably connecting said second and third shafts, and means for longitudinally shifting said first shaft, and a driving connection between said first and second shafts for maintaining engagement in shifted position.

43. In an apparatus of the character described, a base having at least one cam carriage slidably mounted thereon, at least one cam on said carriage, an axially movable shaft journalled in said base, a member secured to said shaft and adapted to contact a cam on said carriage, a gear secured to said shaft, a second shaft journalled in said base, a gear on said second shaft meshing with said first mentioned gear, and means for shifting said first shaft longitudinally, said gears being of sufficient width to maintain intermeshing contact in shifted position of the shaft.

44. In an apparatus of the character described, a base having at least one cam carriage slidably mounted thereon, at least one cam on said carriage, an axially movable shaft journalled in said base, a member secured to said shaft and adapted to contact a cam on said carriage, a gear secured to said shaft, a second shaft rotatably journalled in said base, a gear secured to said second shaft and meshing with said first mentioned gear, a third shaft journalled in said base, means rotatably connecting said second and third shafts, and means for shifting said first shaft longitudinally, the driving connection between said first and second shafts being maintained in shifted position of the first shaft.

45. A machine for integrating charts comprising chart advancing means adapted to receive a chart having curves thereon to be integrated, a plurality of chart tracing means having a fixed law of operation and including styli for following the curves to be integrated, means variably driven in accordance with the movement of said chart tracing means to integrate the product of the square root of said curves, at least one additional chart tracing means having a different fixed law of operation for use in integrating other types of charts, and motion transmission means operatively connecting one of said additional chart tracing means with one of the first mentioned chart tracing means for maintaining the motion thereof proportional.

46. In an integrating mechanism, a tracing pen assembly adapted to be mounted on a base comprising a bracket having a static pressure tracing pen arm assembly and a differential pressure tracing pen arm assembly pivotally mounted upon a common axis, said arms having gear teeth integral therewith adjacent said axis, a pair of separately pivoted gear segments meshing with said gear teeth, a post on said bracket, spring means between said post and arms for biasing said arms in one direction, and means connected to said gear segments to integrate the motion of the pen arm assemblies.

47. In an apparatus of the character described, a base having a cam carriage slidably mounted thereon and carrying a plurality of cams, an axially movable shaft in said base and having a groove therein, a pen carrier swiveled about said shaft, a second member swiveled about said shaft to move with said pen carrier, means on said second member for contacting a cam on said carriage, means for shifting said shaft longitudinally to predetermined positions, and a finger adapted to enter said groove to shift said cam contacting means.

JOHN B. McGAY.